(12) United States Patent
Bou Fadel

(10) Patent No.: US 10,826,763 B2
(45) Date of Patent: Nov. 3, 2020

(54) PORTABLE OUTDOOR CONSTRUCTION SITE DATA CENTER

(71) Applicant: Smart Barrel, Inc., Miami Beach, FL (US)

(72) Inventor: Albert Bou Fadel, Miami Beach, FL (US)

(73) Assignee: Smart Barrel, Inc., Miami Beach, FL (US)

( * ) Notice: Subject to any disclaimer, the term of this patent is extended or adjusted under 35 U.S.C. 154(b) by 87 days.

(21) Appl. No.: 16/274,234

(22) Filed: Feb. 12, 2019

(65) Prior Publication Data

US 2019/0253314 A1 Aug. 15, 2019

Related U.S. Application Data

(60) Provisional application No. 62/713,957, filed on Aug. 2, 2018, provisional application No. 62/630,631, filed on Feb. 14, 2018.

(51) Int. Cl.
| | |
|---|---|
| G06K 9/62 | (2006.01) |
| G06K 9/00 | (2006.01) |
| H04L 12/24 | (2006.01) |
| H04W 84/00 | (2009.01) |
| H04W 84/18 | (2009.01) |

(52) U.S. Cl.
CPC ...... *H04L 41/0806* (2013.01); *G06K 9/00288* (2013.01); *H04L 41/22* (2013.01); *H04W 84/005* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 9,020,848 B1 | 4/2015 | Ridge et al. | |
| 2004/0005914 A1* | 1/2004 | Dear | H04B 1/3822 |
| | | | 455/563 |
| 2006/0094426 A1* | 5/2006 | Donaho | H04W 8/005 |
| | | | 455/434 |

(Continued)

FOREIGN PATENT DOCUMENTS

CN 206433090 U 8/2017

OTHER PUBLICATIONS

PCT/US2020/016923, Apr. 16, 2020, PCT Int'l Search Report & Written Opinion, pp. 1-55.

*Primary Examiner* — Ajit Patel
(74) *Attorney, Agent, or Firm* — Paul Y. Feng; One LLP

(57) ABSTRACT

A portable construction site data center for off-site monitoring and supervision of construction sites and for on-site construction worker interface. The portable construction site data center has a housing that is resistant to outdoor elements, with a mounting platform for supporting the housing on any common construction site fixture such as a safety barrel or drum. The housing has dimensions and a weight that enable portability for hand carry. The housing has a keyboard, a display, a camera, interactive color LEDs, and an RFID transponder for worker interface, and a CPU with memory to process the worker interface data. A battery and solar cell power the system. An antenna allows the system to access to Wi-Fi, Bluetooth, and cellular network signals thus enabling the system to access, via the internet, remote and local digital devices.

19 Claims, 23 Drawing Sheets

(56) References Cited

U.S. PATENT DOCUMENTS

| | | | |
|---|---|---|---|
| 2007/0045424 A1* | 3/2007 | Wang | H04W 40/246 235/462.46 |
| 2008/0177646 A1 | 7/2008 | Frink | |
| 2012/0066178 A1 | 3/2012 | Omansky et al. | |
| 2012/0190386 A1* | 7/2012 | Anderson | G01S 19/14 455/456.3 |
| 2016/0011896 A1* | 1/2016 | Khalid | H04L 41/5041 718/1 |
| 2017/0006576 A1* | 1/2017 | Barrett | H04W 4/80 |

* cited by examiner

SEE FIG. 26

NEW HOLE FOR CABLE GLAND AND SIZE AND LOCATION

LAN CONNECTION

WINDOW FOR CAMERA & LEDs

WINDOW FOR DISPLAY

ETCH OR PRINT RFID SYMBOL

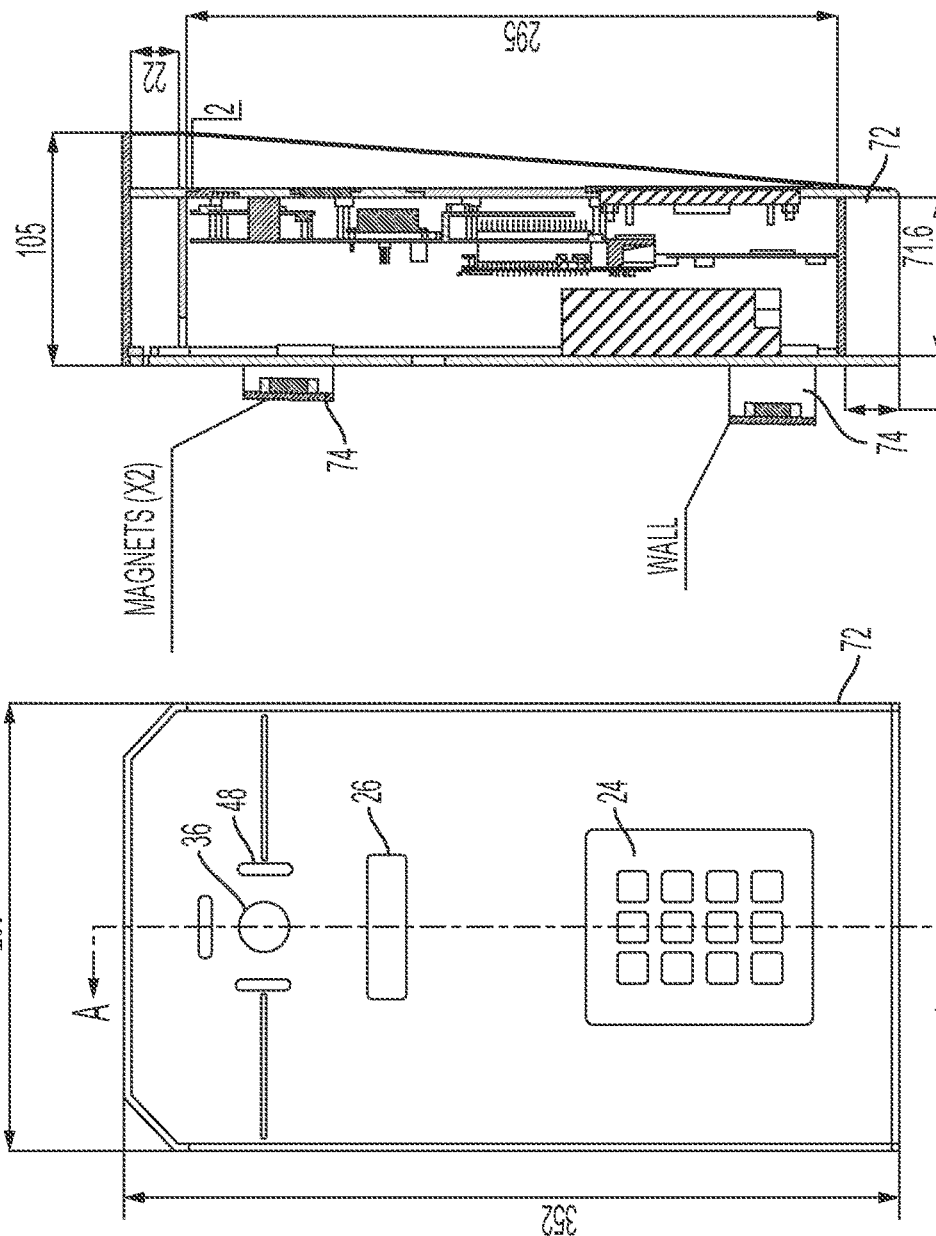

PORTABLE OUTDOOR CONSTRUCTION SITE DATA CENTER

CROSS-REFERENCE TO RELATED APPLICATIONS

This application claims priority from provisional application No. 62/713,957, filed Aug. 2, 2018; app. No. 62/630,631, filed Feb. 14, 2018; and app. No. 62/336,478, filed May 13, 2016, the contents of all of which are hereby incorporated by reference.

FIELD OF THE INVENTION

The present invention relates to a portable outdoor construction site data center. In particular, the present invention relates to a self-contained data center accessible by construction site workers and mounted to a construction site fixture such as a traffic safety barrel, drum, or channelizer, a safety barrier, a wall, a lamp post, etc.

BACKGROUND OF THE INVENTION

Skyscrapers, commercial shopping malls, office buildings, planned community centers with dozens of homes, governmental construction for streets, bridges, etc., all require many skilled workers, laborers, and project management to convene at the job site daily. Depending on construction schedule, the skilled workers, laborers, and management must attend the job site 24-hours per day and on weekends. In order to monitor and organize all such activity and individuals, there is typically a project trailer or foreman's shed built on the site serving as a focal point for managing all such construction activity.

The project trailer or shed is the headquarters for managing, supervising, and controlling the construction site resources and personnel. The project trailer or shed houses office furniture, data and telecommunications, payroll, worker supervision, accounting, meeting room, site security and monitoring, etc. Such a facility is very expensive and cumbersome to set up, break down, and move around. These limitations are more acute for a work site that spans great distances such as for a length of roadway or high way where the project trailer or shed needs to be broken down, moved down the road, and the set up again to stay in the center of the action. Furthermore, smaller budgeted construction projects sometimes cannot afford to purchase or rent an expensive trailer or shed.

SUMMARY OF THE INVENTION

The present invention is directed to a portable, outdoor construction site data center that is mountable on a standard construction site fixture such as a safety barrel, traffic drum, barrier, wall, or the like. The data center can be used not only at a construction site, but is applicable to any outdoor operation such mining, agriculture, farm, ranch, recreational park, rock concert, school or university campus, etc., where users, workers, admin personnel, and management can interface on a central supervisory, communications, and control hub.

The data center in a preferred embodiment is comprised of a portable housing having an exterior that is resistant to outdoor elements, the portable housing has a tower shape, with a top and a bottom, wherein the housing includes a mounting platform supporting the housing on the construction site safety barrel or wall. The housing has dimensions and a weight including contents that enable portability for hand carry. The data center has a means for human or user interface and conversion to digital data, the means including a keyboard, a display, a camera, and optionally an interactive color LED lighting proximate the camera, disposed about the housing exterior and mechanically sealed to resist environmental elements (e.g., rain, snow, dust, debris, smoke, etc.) from entering into the housing. In one embodiment, the tower shape of the housing sitting atop a waist-high safety barrel is highly ergonomic for the worker who would be standing while using the data center.

The human interface generates digital data that is processed via a CPU with electronic memory held within the housing, but also includes memory on a cloud-based, remote server. The CPU controls the data center functions as well as processing and communicating the digital data on the web. A Global Positioning System (GPS) tracking module is wired to the CPU to geolocate the data center housing. A battery and/or alternate electrical supply source powers the CPU, means for human interface, and GPS module. In addition, a solar cell is embedded in a movable panel is disposed at the top of the housing and wired to the battery and system electronics, wherein the movable panel includes a deployed position for operation and a stored position for transport. The data center includes at least one antenna wired to the CPU, which has access to Wi-Fi, Bluetooth, and/or cellular network signals. This enables internet access to the digital data so that the data center is accessible by workers' mobile devices, and by authorized individuals off-site using a mobile device, tablet, or pc via the internet.

In a preferred embodiment, the solar cell panel is pivoted to the housing top, and the panel has a cantilevered section overhanging the housing exterior in the deployed position. This gives shade to the worker from the outdoor weather elements (e.g., sun, rain, snow, construction soot, dust) while he or she is operating the data center. The means for human interface includes digital data from a worker's keyboard entry, the camera's facial recognition software, and GPS location data. An RFID transponder may the added to the housing for use by the worker to ease with login, clock in/out, or limiting system access by unauthorized users.

Preferably, the housing platform includes a bottom with an elongated notch, and the construction site safety barrel includes a top with an elongated, raised rib—usually in the form of a handle—wherein the housing rests on the barrel with the elongated notch receiving the elongated raised rib therein.

Therefore, the present invention portable construction site data center has all of the important supervisory, communications, and monitoring functions of a foreman's trailer or shed on any construction site, but is much more inexpensive to own or operate and much easier to transport from site-to-site, or from location-to-location. There is no need for motorized towing to move the trailer, or the set-up and break down of a shed. There may be multiple data centers situated around a large area construction site, bringing convenience to all site personnel who can go to the nearest data center to do business instead of traveling to a single trailer or shed located far away.

BRIEF DESCRIPTION OF THE DRAWINGS

FIG. 38 is a front elevational view of an alternative embodiment data center with a wall mount housing.

FIG. 39 is a cross-sectional view taken along line A-A from FIG. 38 of the wall mount housing.

DETAILED DESCRIPTION OF THE PREFERRED EMBODIMENTS

Figures 1A, 1B:
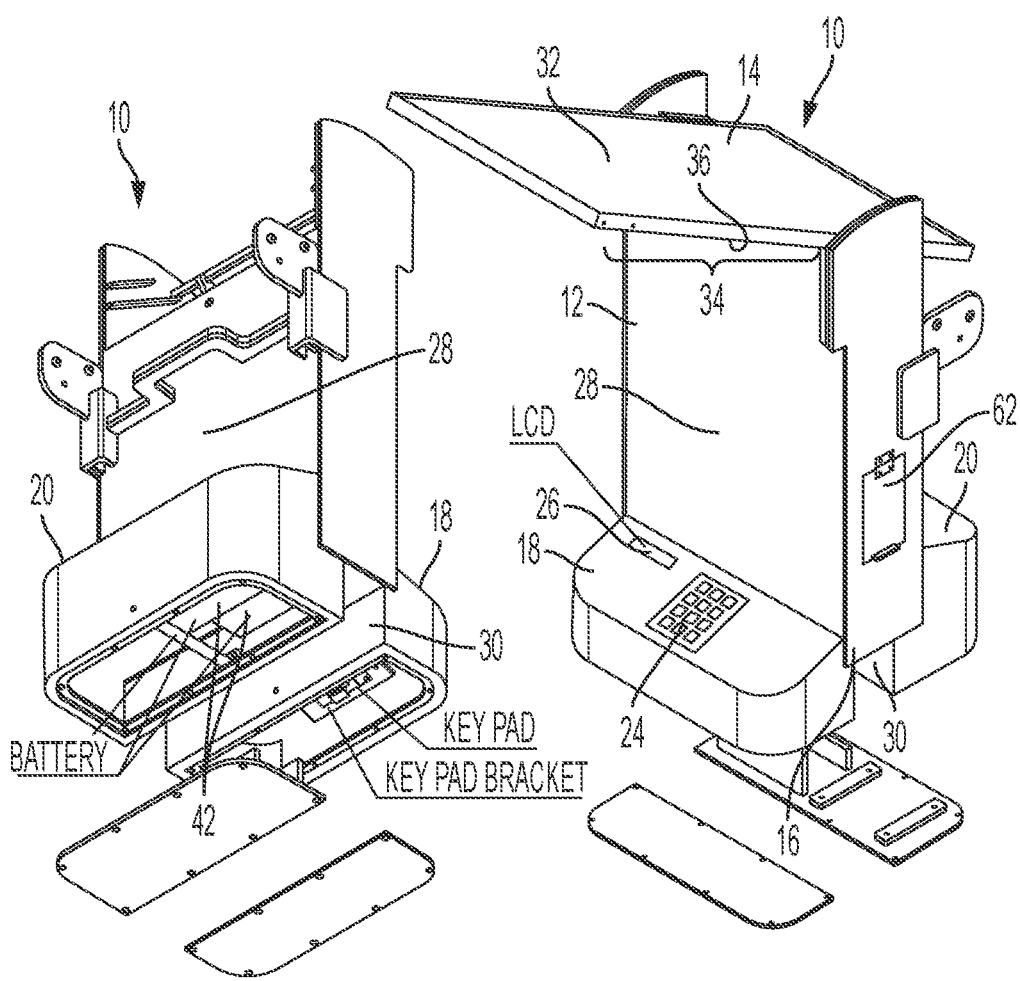
FIG. 1(a) is a rear perspective view and FIG. 1(b) is a front perspective view of a preferred embodiment data center.

The present invention is directed to an outdoor, portable on-site data center for local and remote off-site communication, monitoring, and supervision of construction sites and their personnel, and for on-site construction personnel interface. FIGS. 1-5 show a portable construction site data center 10 in a preferred embodiment. The data center 10 has a housing 12 that is resistant to outdoor elements. FIG. 1(a) is a perspective rear view of the housing 12 and FIG. 1(b) is a perspective front view of the housing 12. The housing has a top 14 and a bottom 16. At the housing bottom 16 is a mounting platform, general a first platform 18 and a second platform 20, for supporting the housing 12 upon any common fixture found on a typical construction site (FIG. 17) such as a safety barrel or drum 22, barrier, or wall.

Figure 14:
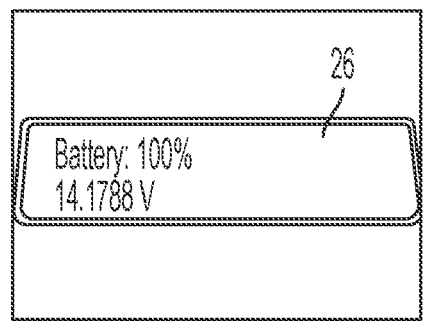
FIG. 14 is a magnified view of a display.
Figure 16:
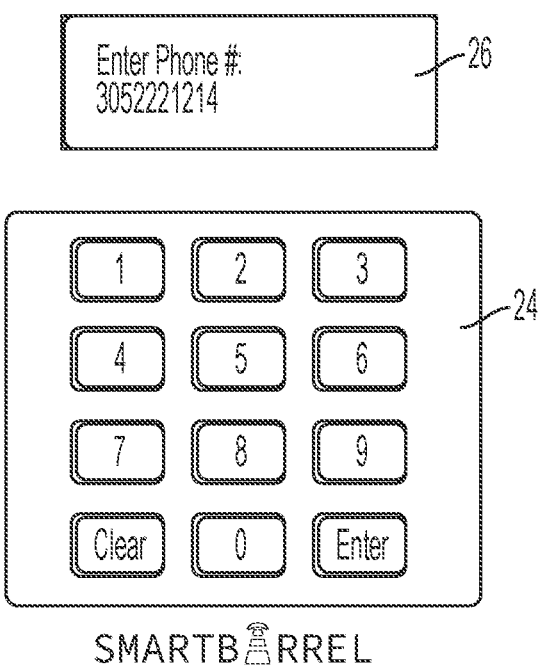
FIG. 16 is an isolated view of a keypad and display.

For human (i.e., user or worker) interface, the housing exterior surface typically includes an alphanumeric keyboard or numeric keypad 24 and display 26 (FIGS. 14, 16) located on the first platform 18. The housing platforms 18, 20 support a central tower 28. At the bottom 16 of the housing 12 is an optional notch 30. At the top 14 of the housing 12 is an optional solar cell array embedded on one or more panels 32. The solar panel 32 is movable, preferably pivotable or hinged for manual adjustment to face the sun. Further, the panel 32 has a deployed position (FIGS. 1(b), 2-5) when in use and a stored position (FIGS. 2, 3) for when the data center 10 needs to be transported to a new location. A cantilevered portion 34 overhangs the first platform 18 to provide shade the display and keyboard and for protection of the worker (FIG. 7) from environmental elements, such as sun, rain, snow, dust, debris, etc. In the side view of FIG. 2, the housing 12 has an inverted "T" appearance with the central tower 28 extending above the bottom platform 18, 20.

Figure 7:
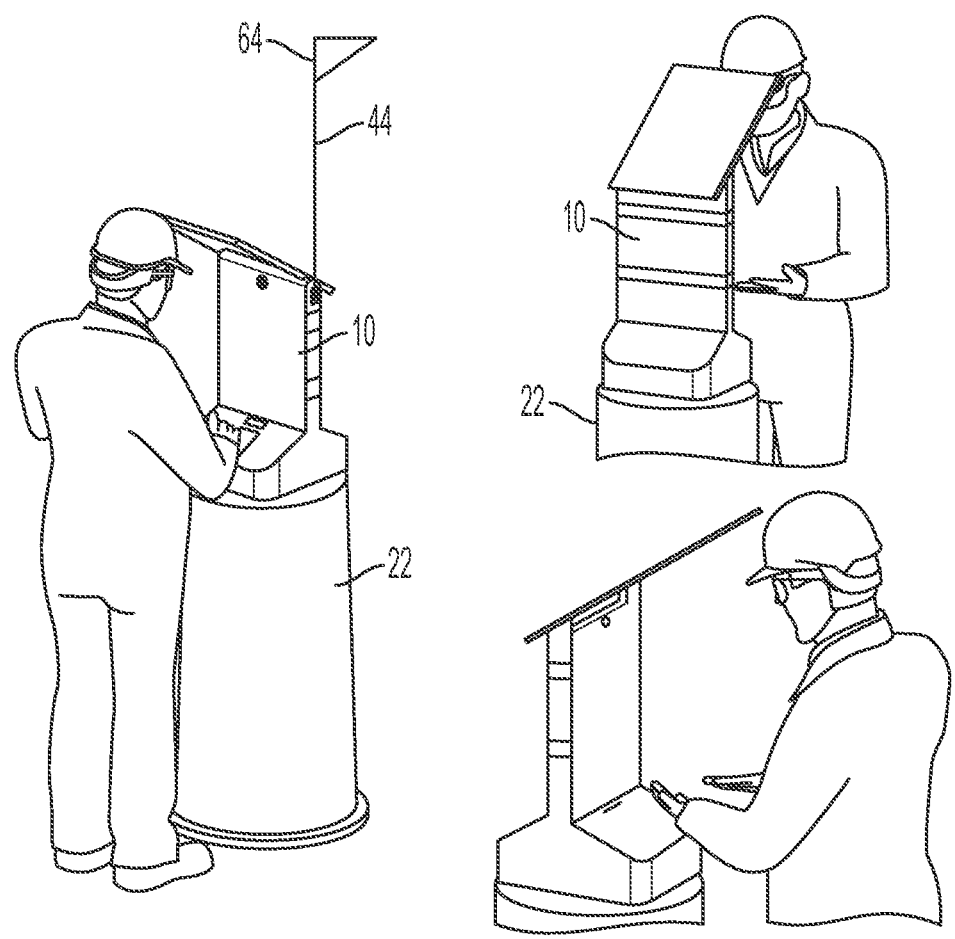
FIG. 7 are various views of a worker operating a data center that is mounted on a construction site safety barrel.

Mounted on the tower 28 is a camera 36 (FIGS. 8, 9, 13) with a lens that faces the worker when he or she is accessing the data center 10 (FIG. 7). The housing 12 may include an RFID transponder 38 for human interface such as user identification. The housing 12 holds a CPU with memory 40 (FIG. 23) to process the worker interface data. The memory may include a local SD card, flash drive, optical drive, thumb drive, USB drive, or cloud storage on a remote server, or any combination thereof.

One or more rechargeable batteries 42 and a solar cell power the system. An alternate power supply, such as a DC car charger 52 (FIG. 23) can be used for electrical power. An AC-to-DC rectifier/transformer with an AC line to plug into an AC socket is also contemplated.

An antenna array 44 allows the data center system to access Wi-Fi, Bluetooth, and cellular network signals. This enables the data center system to access, via the internet, remote and local digital devices such as cell phones, tablets, laptops and personal computers as depicted in FIGS. 28-31. The internet access enables cloud storage of the digital data on a remote server.

The preferred embodiment data center includes a GPS module 50 (FIG. 23) for geolocation of the data center 10. It is in constant communication with the CPU 40 (FIG. 23) and communicates via the antenna 44 with on-site users and workers and off-site personnel. This assists management in supervising the job site and tracking labor and job-site tasks. The GPS module 50 also enhances security of the data center 10 in case of theft if the data center is removed from the job site.

Figure 13:
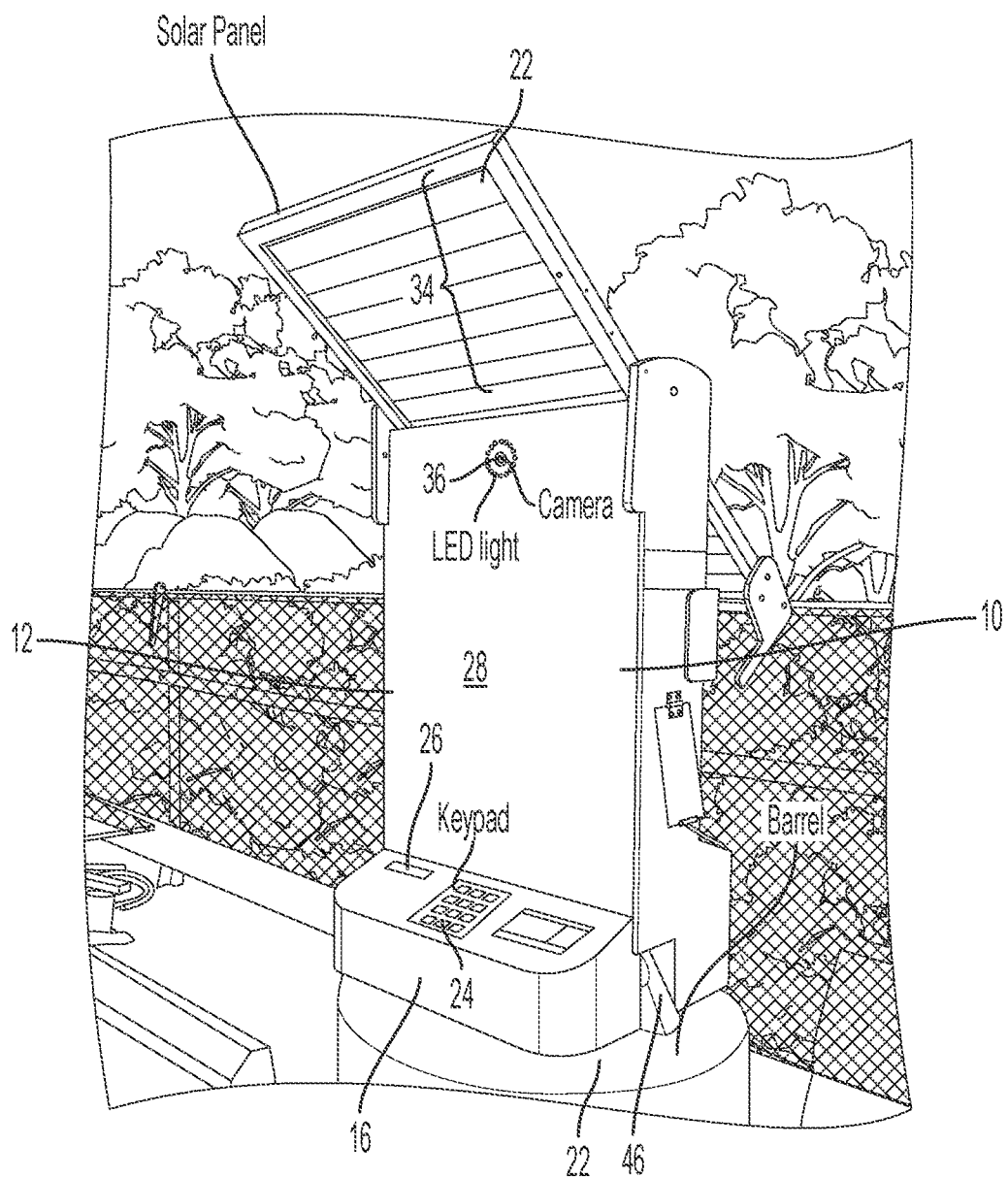
FIG. 13 is a perspective view of a preferred embodiment data center in its operational state and resting atop a safety barrel.
Figure 25:
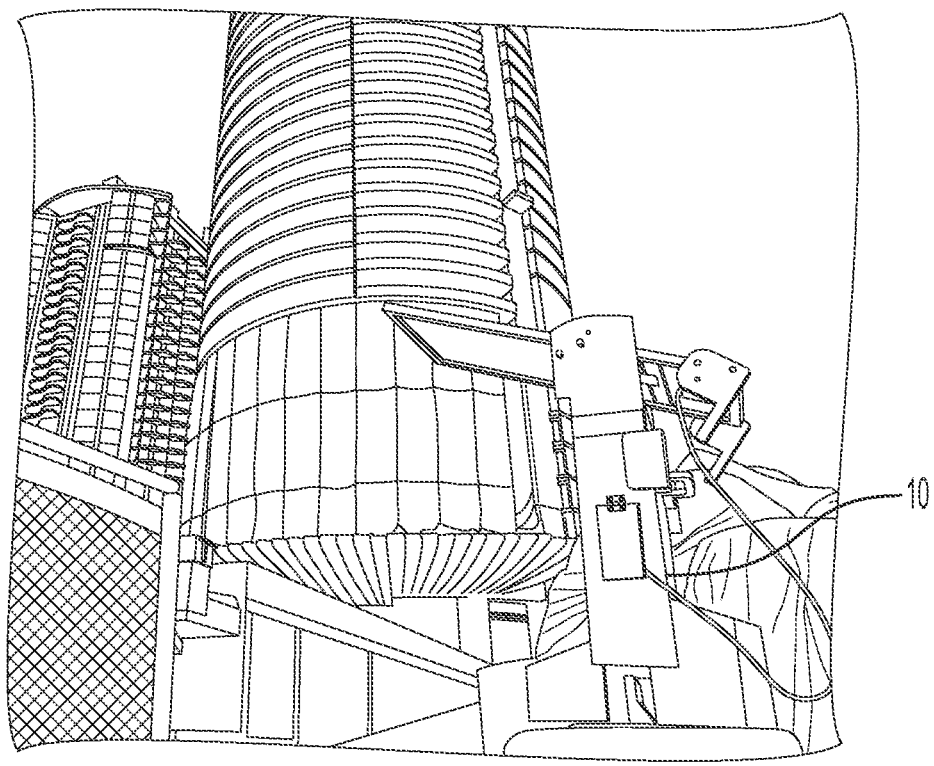
FIGS. 25-27 show the data center situated out in the field at several construction sites.
Figure 26:
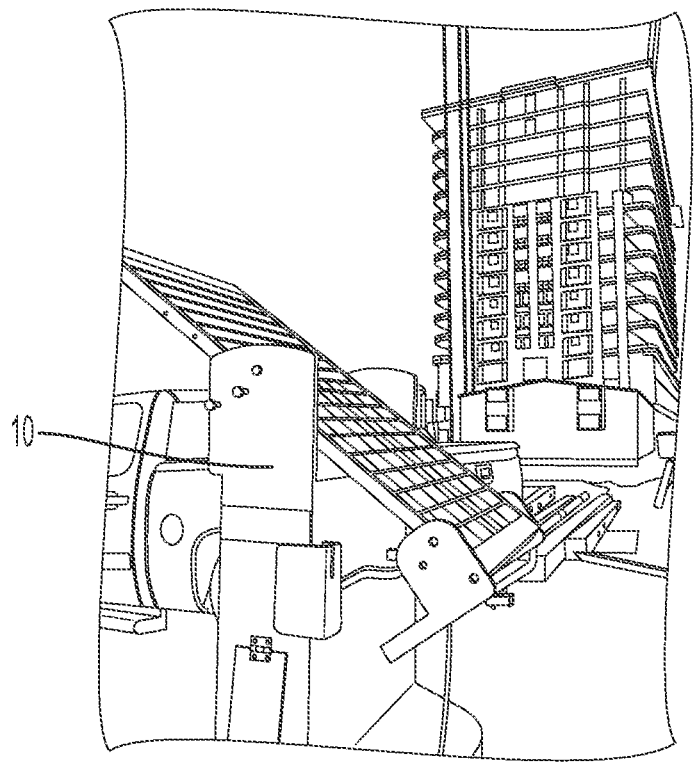
Figure 27:

As depicted in FIG. 7, the arrangement of the housing 12 sitting atop the safety barrel 22 or similar construction site fixture is highly ergonomic for the worker who stands while working on the data center 10. The safety barrel 22 is standardized safety fixture, and it must comply with federal (OSHA), state, and industry codes. It provides a convenient and solid base for the data center 10 to rest on. As seen in FIG. 13, standardized safety barrels 22 have a raised rib 46 at the top, which is the handle for carrying or moving the barrel. That rib 46 engages the notch 30 formed into the bottom 16 of the housing 12. FIGS. 25-27 show the present invention data center 10 in use at different job sites.

As seen in FIG. 7, the data center 10 has fairly compact dimensions as compared to the worker and the safety barrel 22. As such, the housing 10 preferably has dimensions and a weight that enable portability, meaning that a worker can hand carry and move the data center for transport. As compared to a conventional foreman's trailer, there is no need for a motorized tow truck to tow the trailer. There is no need for break-down of a conventional foreman's shed and motorized equipment to move the shed to a new location. The preferred embodiment data center 10 is self-contained with its own battery power source and wireless communications capability, so no hard wiring is needed.

Exemplary Application of the Portable Data Center

The present invention data center 10 in one exemplary embodiment can be used as a time attendance system that is portable and can be mounted on multiple platforms, but mostly adaptable to construction site safety barrels 22. The data center 10 is 100% grid free, uses solar power and other power sources for energy. The data center 10 is kept on site for as long as it is needed to perform the task. The construction site workers or users can clock in and clock out via a weatherproof stainless-steel keyboard 24 that allows him to enter his code or password (mostly optimized for cellphone number usage as user identity). Once the user enters his code, the data center 10 detects automatically or prompts the user to choose whether he is clocking IN, OUT, Starting Lunch Break, or Ending Lunch Break. After that, the data center 10 detects if it is dark via the camera 36 and uses a surrounding LED lighting ring 48 (FIG. 8) to illuminate the user's face and snap a picture of the user's face. All information/digital data are then sent instantly to the cloud database and the user receives a text message on his mobile device or phone (FIG. 30) confirming the success of the clocking.

The user is not required to pre-set or setup anything on his cellphone or mobile device. As long as the cellphone receives SMS, the user can receive the clocking receipt. If not, the data center 10 is still capable of performing normally.

All the data can be monitored and tracked from a software platform that management can have access to via the internet. The platform offers more than just attendance readings.

The data center 10 is preferably GPS 50 equipped and registers the data center coordinates, movement, and tracks weather affecting the construction site. Also, the data center 10 is equipped with an anti-theft system that triggers an alarm 54 (FIG. 23) once the data center 10 is moved without proper authorization. The GPS 50 informs all management via SMS and email (or any other medium needed) and puts the system into an emergency lock down mode.

Housing Enclosure

In FIGS. 1(a) and 1(b), the preferred embodiment housing 10 is made of durable plastic to withstand all outdoor weather and harsh conditions. The housing 10 is designed in a manner that has almost zero exposure to operable screws to access the hardware mounted inside the device. Once installed and operable all screws are hidden either underneath the device or under the roof solar panel 32. Further, the ON/OFF switch 56 (FIG. 23) is also located in a strategic location inaccessible and non-visible to any passing personnel.

The data center 10 can be mounted on any flat surface using the notch 30 to mount directly on any OSHA construction barrel 22. Once resting the housing 12 has a locking rod that is inserted and locks into place to keep the housing well secure on the barrel.

Figure 2:
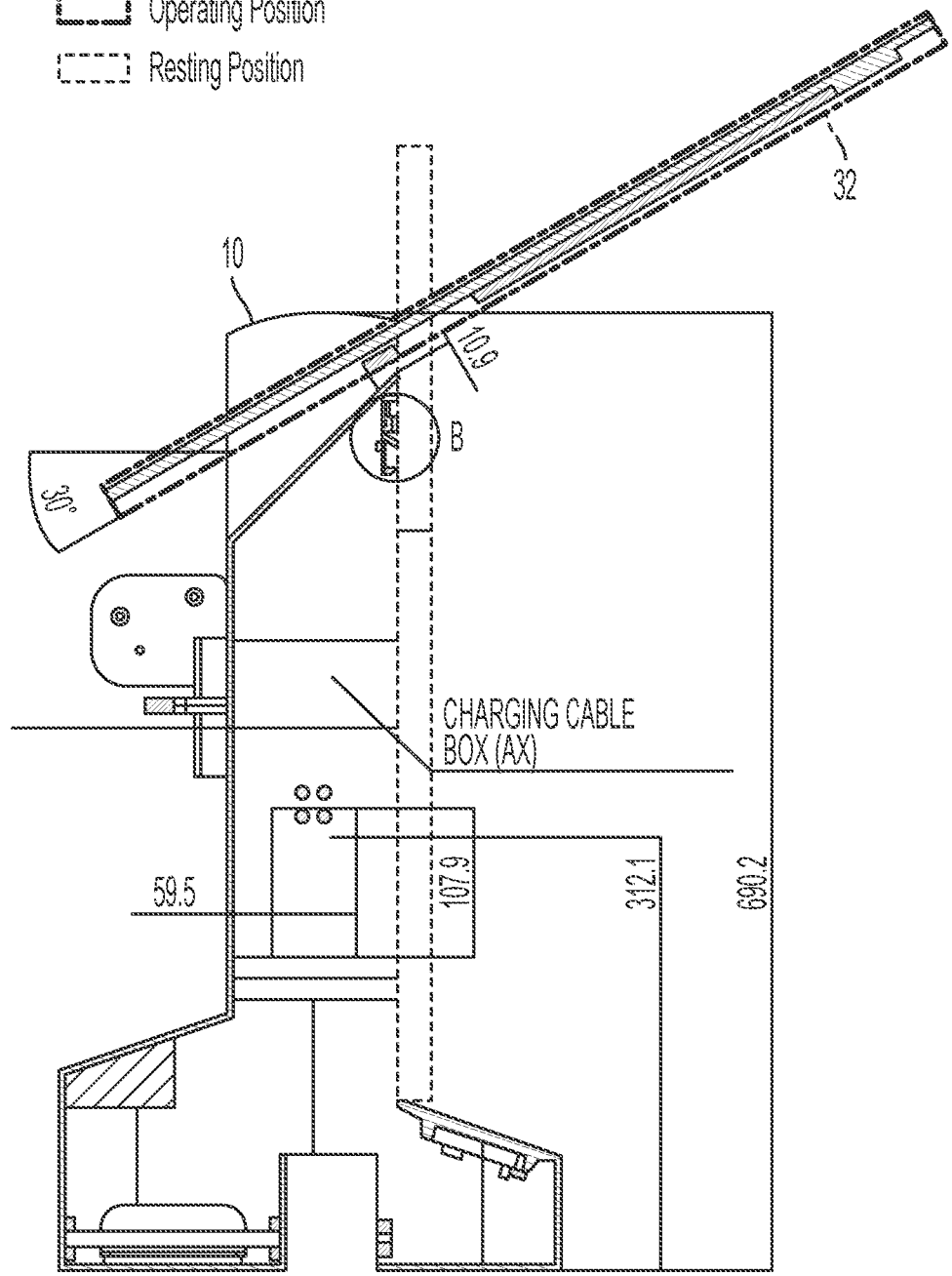
FIG. 2 is a side elevational view of a preferred embodiment data center showing a deployed solar panel.
Figure 3:
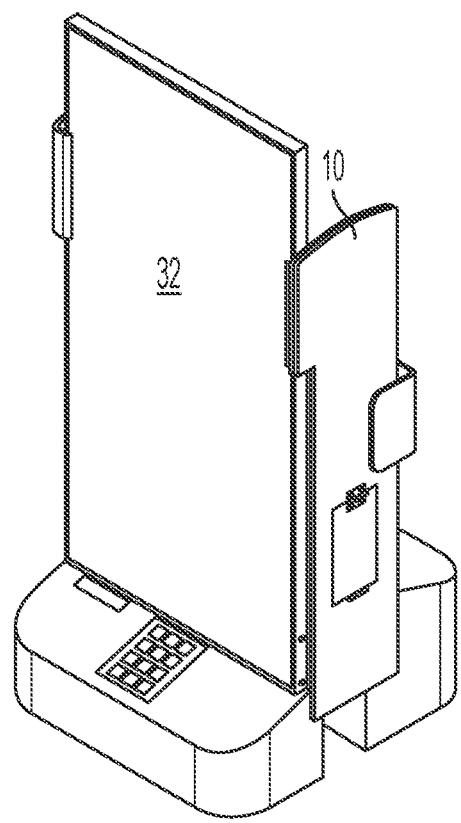
FIG. 3 is a perspective view of a data center where the solar panel is stored for transport.

FIGS. 2, 3 show the operational/deployed position and resting/stored position for the solar panel 32, respectively. Once operational the data center 10 is designed to stay 24/7 ON and on or off the grid. In order to do so several powering methods are used.

The solar panel 32 is wired onto the data center and has two mounting positions as shown in FIG. 2.

Resting Position of FIG. 3: The solar panel slides vertically onto the channel to protect the camera lens and take minimal space for transportation. This position provides minimal space for storage and movement while protecting the camera and the solar panel.

Operational Position of FIG. 2: The solar panel is then pulled and slide on a diagonal track that lays on top of the enclosure, keeping the solar panel on an optimum angle for maximizing charging capacity. The solar panel 32 has a locking bracket that will indicate the stop of the panel to get it to its exact position. One of the solar panel sides is marked with "This Side Facing South" as instruction of device orientation also to enhance and maximize solar storage.

Figure 4:
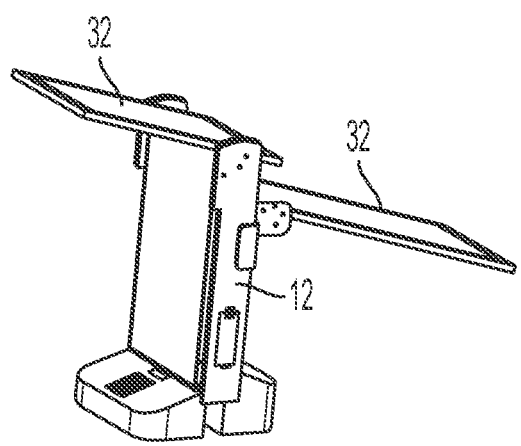
FIGS. 4 and 5 are perspective views of a data center having multiple solar panels in their deployed position.
Figure 5:
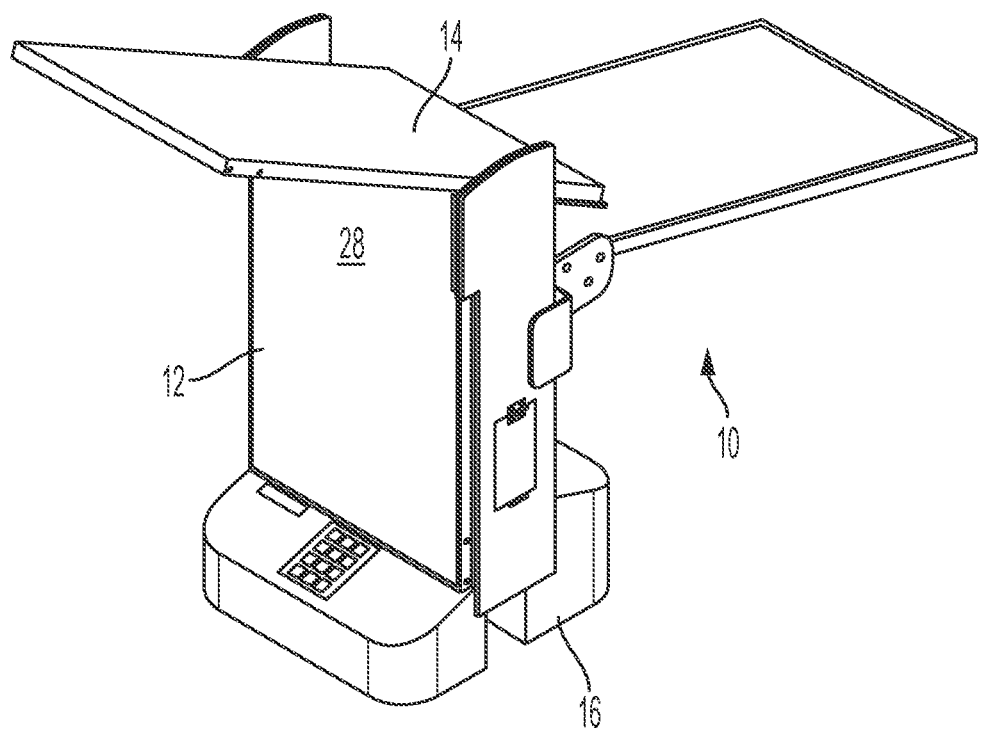

In case of a short time for solar exposure due to weather conditions, buildings, geographical location, a second 30-Watt or like solar panel 32 can be mounted on the back of the data center 10 to double its solar power and double its charging speed, as seen in FIG. 4.

Figure 20:
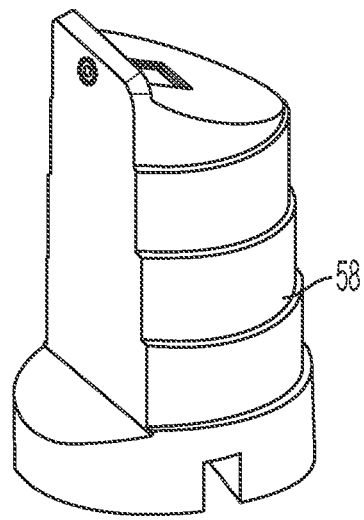
FIG. 20 is a perspective view of still another alternative embodiment data center, where the housing tower is a barrel shape.
Figure 21:
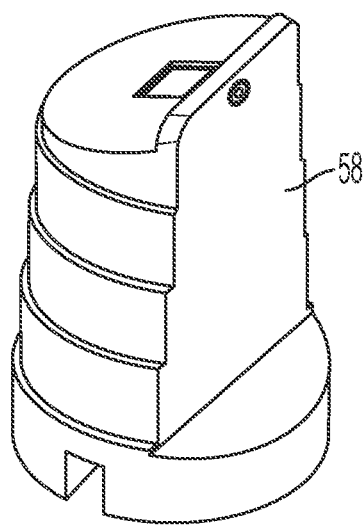
FIG. 21 is another view of the data center housing from FIG. 20.
Figure 22:
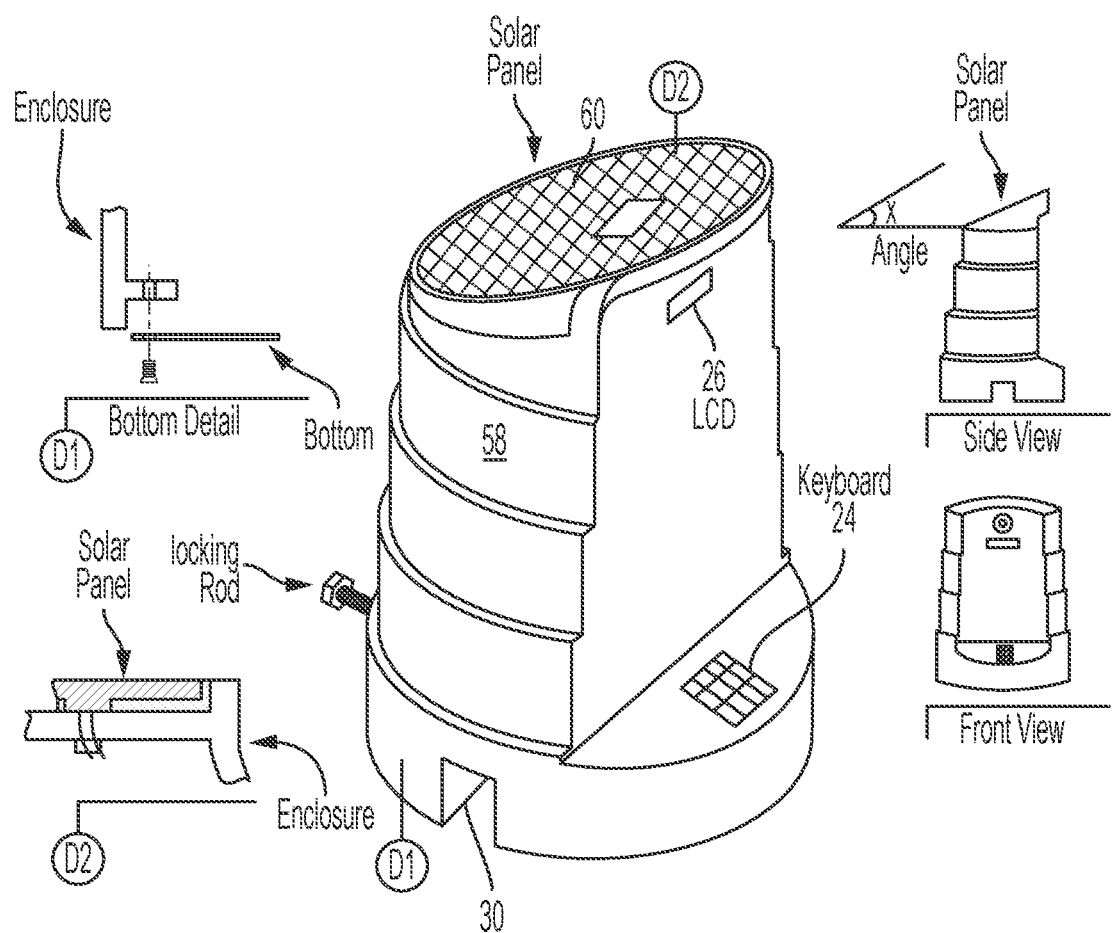
FIG. 22 is still another view of the data center housing from FIG. 20 where the solar cells are embedded to the top surface.

In an alternative embodiment of FIG. 22, the data center 58 can include a fixed solar panel 60, mounted on top of the data center for further protection and embedded in the data center to maximize the protection of the solar panel. The panel wattage can depend based on the latest electronics board used, therefore changing the solar power wattage and dimension. FIGS. 20, 21 are different perspective views of the alternative embodiment housing shape. The housing 58 has a barrel-shaped with a platform at the bottom.

In case the solar panels 32 are not doing the job, the data center 10 is optionally equipped with a car charger adapter wire 52 (FIG. 23) that can be pulled from the side of the enclosure and attached briefly into any truck or car cigarette lighter to charge the data center batteries and keep it from shutting down.

In case none of the above power sources is working, the data center is also optionally equipped with a 12V universal plug that can be attached to any charging method possible ranging from 120V AC to 12V DC adapters, to 12V DC external batteries, to any other compatible power source.

Figure 6:
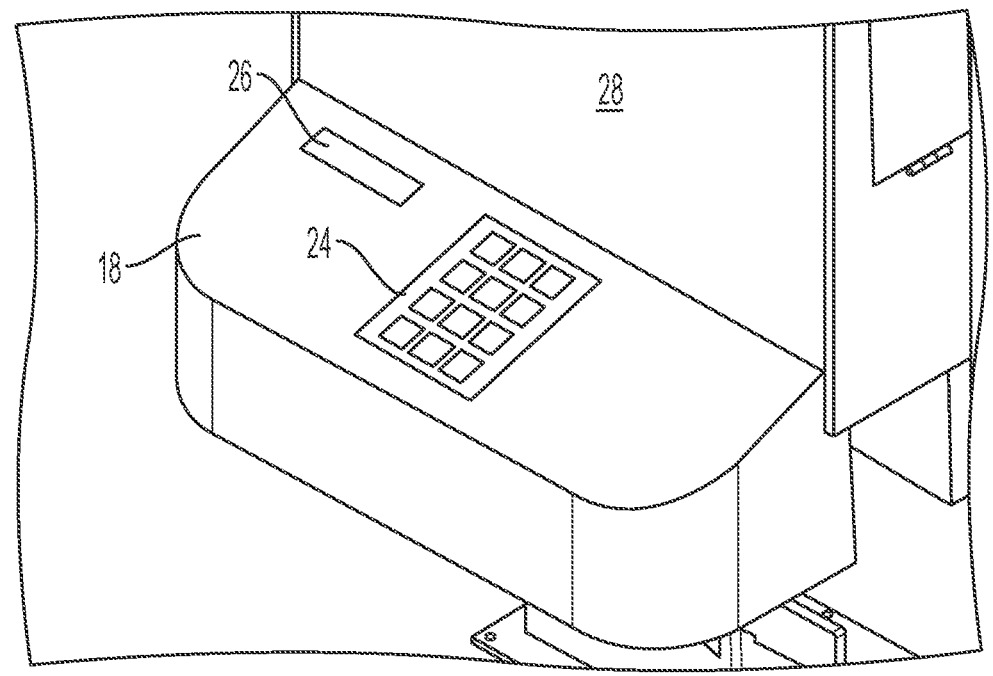
FIG. 6 is a magnified view of a keypad and display.
Figure 18:
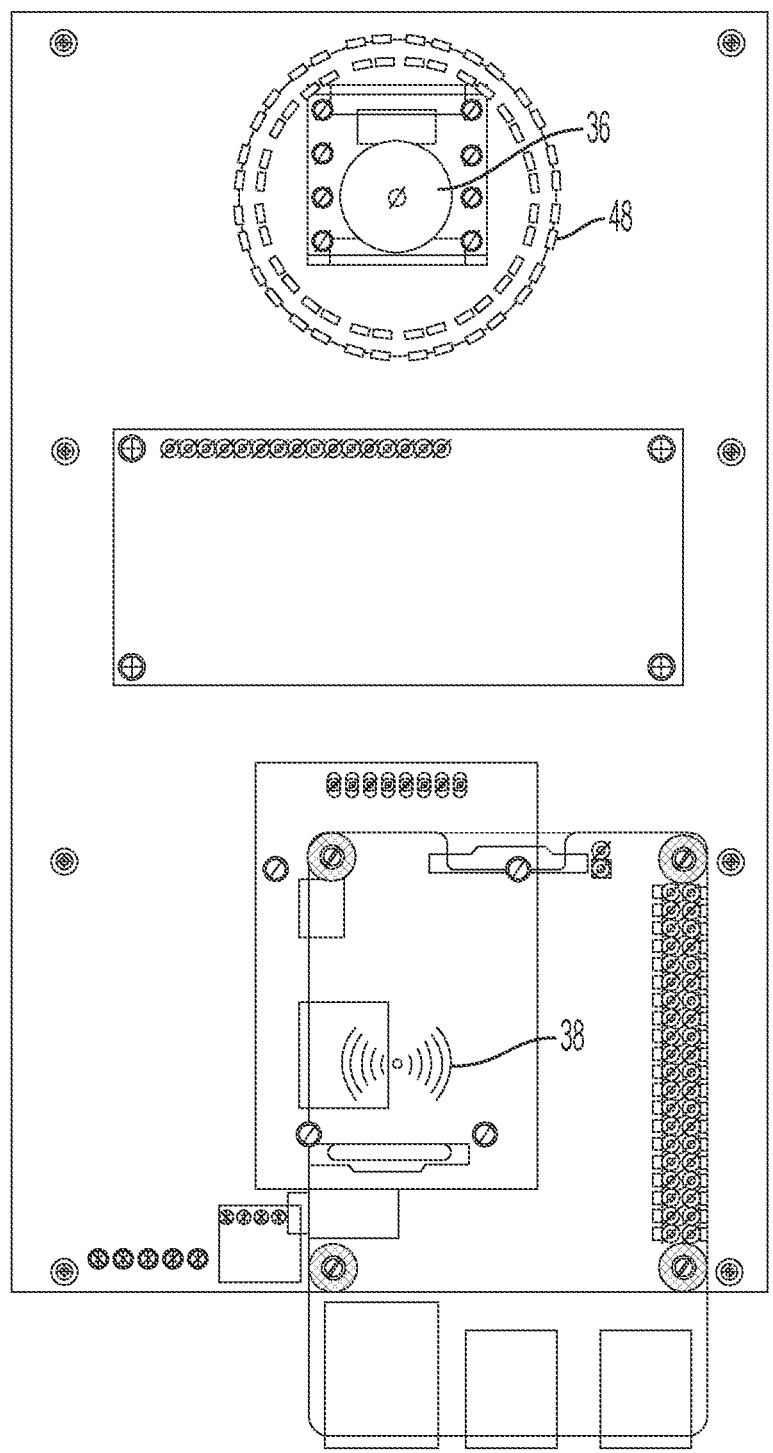
FIG. 18 depicts a circuit board for the camera, LED lighting, and RFID transponder.

As seen in FIG. 6, conveniently positioned at a height above ground, the worker finds tilted a stainless-steel, weather-sealed weather-proof keyboard 24 for data entry. This is the main communication board or interface between the user/worker and the data center 10. The worker will enter any type of code onto the data center 10 to clock in and to pull further information, and the data center 10 can provide such as, e.g., device name, device connection info, device health status, device location, diagnostics and much more) via the display 26. The LCD screen display 26 (FIG. 14) that shows instruction for the worker to guide him through the steps and to display data once queried. FIG. 18 shows a circuit board mounting the camera 36, RFID transponder 38, and LED lighting 48.

In FIGS. 1(b) and 7, the camera 36 is positioned at about eye level for the worker (i.e., ground plus barrel height (OSHA standard) or custom-built stand plus housing height). The camera 36 is preferably located near the top of the housing 12, facing the worker and protected by the solar panel 32 above. The camera is preferably capable of high resolution and snaps a picture (or video) instantly when worker enters his code and executes the clocking. The data center 10 is able to detect if it is dark or not (via method 1: a photo-sensor disposed on the housing, or method 2: current time polled from the GPS module 50 (AM or PM vs. daylight or nighttime) and accordingly decides to either take the picture with or without LED flash lighting 48 proximate the camera lens 36.

Figure 8:
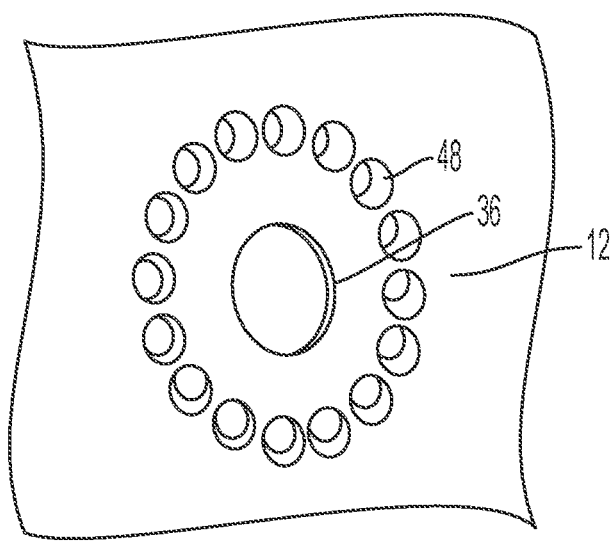
FIG. 8 shows a preferred embodiment camera mounted to the data center and a ring of color LED lights surrounding the camera lens.
Figure 9:
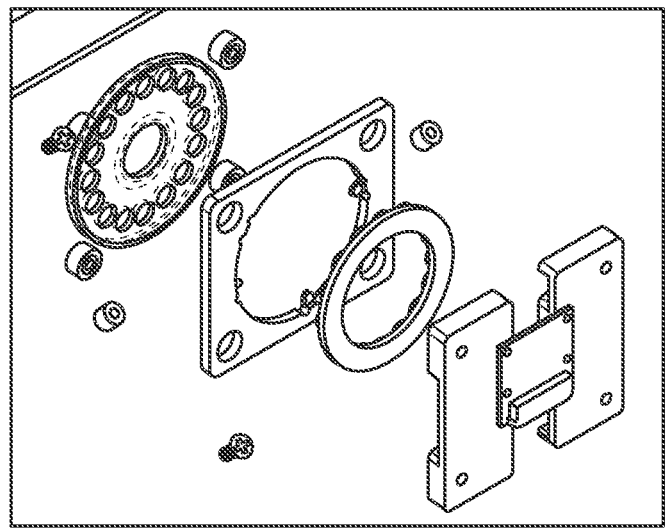
FIG. 9 is an exploded view of the camera lens and surrounding LED lights with mounting hardware.

In FIGS. 8, 9, around the camera lens 36 are an array of LED lights 48 arranged in a ring. FIG. 8 shows the surrounding mounting hardware for the LED ring 48. The LED ring 48 has multicolor LEDs and serves several human interface purposes.

Device Breathing Status: Every several minutes or preselected period of time, the LED ring 48 will blink to indicate to the worker that the system is alive and running.

Interactive: The LED ring 48 will flash green if the worker is successfully clocked in, flash red if he entered a wrong entry, flash yellow while waiting for worker's data entry and so on.

Flash: The LED ring 48 will light up in bright white to act as a camera flash when the surrounding lighting conditions are too dark to illuminate the worker's face.

Additional LED communication portal: The LED ring 48 communicates in terms of colors and effects to reflect a more "international" intuitive reaction to influence the worker's behavior, e.g., flashing red for warning, flashing green for okay, fade IN/OUT blue for breathing or alive, and so on. The LED ring 48 may act as a display screen replacement is some situations where the LED ring colors, brightness, blink or steady on/off will be enough to interact with the worker to notify him if his clock in went through or not.

The LED has may also function as level-meter to suggest the worker to get closer or farther from the camera lens, or to signal if the camera image is not clear or to warn when the alarm is on, etc. A preferred mount in FIG. 9 is designed to incorporate the LED ring 48 locking mechanism on the housing 12 and to have the camera 36 located in the center.

Figure 10:
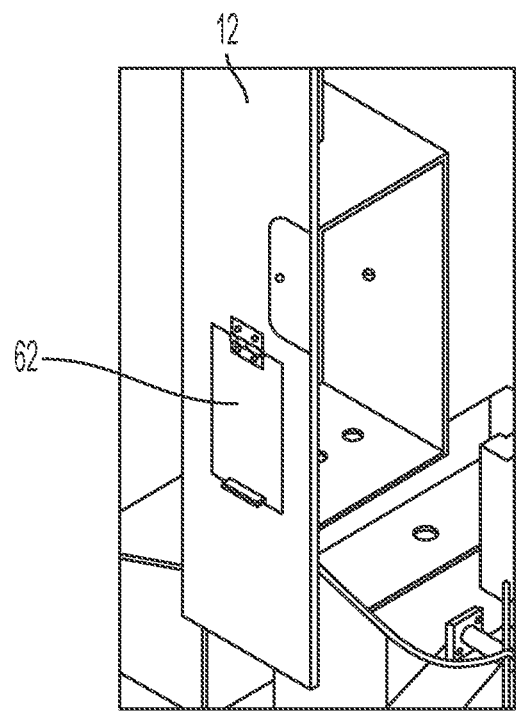
FIG. 10 shows an optional side door covering a compartment inside the data center.

FIG. 10 shows a side of the housing 12, which has a magnetic locking door 62 that gives access to a small compartment where most power adapters are hidden and protected. The compartment may contain, e.g., additional solar panel adapter plug, a car plug charger adapter wire, an international charging adapter plug. The door 62 and the compartment inside are 100% weather protected and tightly sealed.

Figure 11:
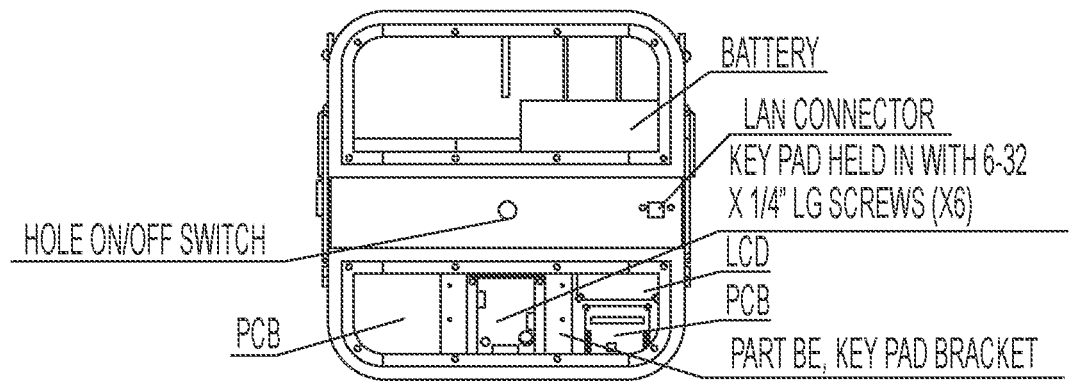
FIG. 11 shows the bottom of the data center with the access panels removed to reveal its internal hardware.

At the back the data center housing 12 is a built-in handle to ease the transportation of the data center 10, and two sockets where the external solar panel mounts to. Near or at the bottom of the housing, FIG. 11, on the side are female LAN or USB network socket. This is used for multiple purposes ranging from:

Technical Device Access: Access the hardware without dismounting or shutting down via any PC or device.

Phone or Tablet device charging: Use the on-board battery power to charge other devices.

Run device compatible accessory: products such as a weather stations kit, 360-camera video kit, device-to-device connector, etc.

Preferably located at the bottom 16 of the housing 12 (FIG. 11) at the center, the hardest point to reach, is a weather proof ON/OFF switch 56. The button 56 is only accessible prior of the data center getting mounted to a construction site safety barrel 22 or the like. The rib 46 of the safety barrel preferably pushes the power button 56 ON. Removing the data center 10 from the safety barrel turns the power switch 56 to OFF.

Figure 12:
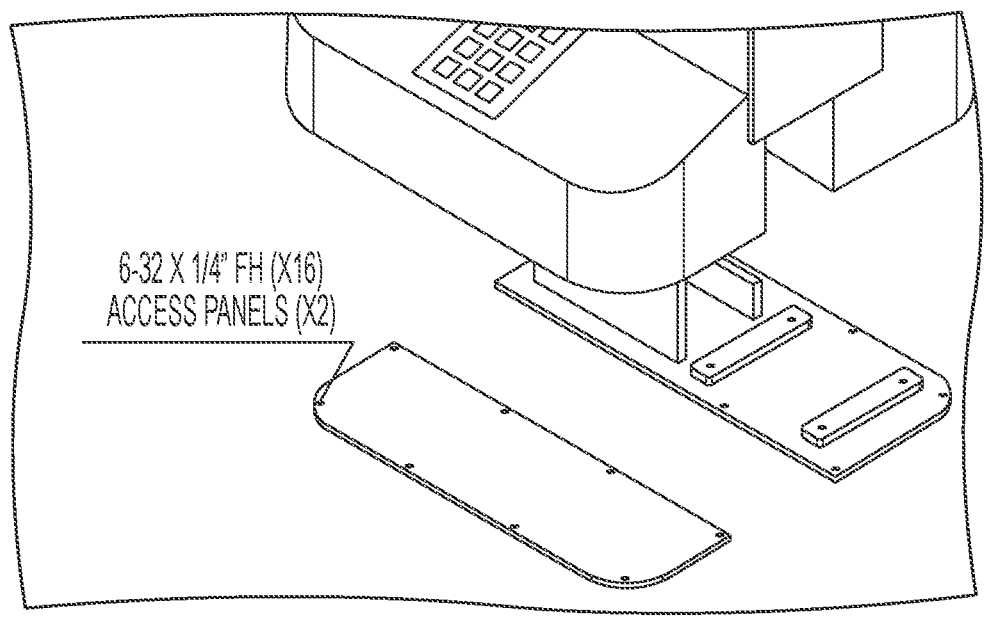
FIG. 12 shows the access panels removed from the bottom of the data center mounting platform.

In FIG. 12, at bottom 16 of the housing 12 is a set of 8 screws on each side that need to be unscrewed to access the inside of the housing 12. The screws are stainless steel for maximum weather resistance and they can vary from Philips head to custom head based on security level measured. The screws are also hidden under a ½" Neoprene outdoor foam material that is glued on the bottom of the housing. The material acts as a cushion for the device to level it and also absorbs the shocks from user keypad entry making it more stiff and robust and much less shaky.

Reflective tape may be added to the sides of the device for extra detection at night time in public area where light can be limited. Also, a flag 64 (FIG. 7) can be added to the side to make the data center 10 more detectable in wide open or crowded places. The flag pole may serve as the antenna aerial 44.

Summary of Main Electrical Components

Figure 23:
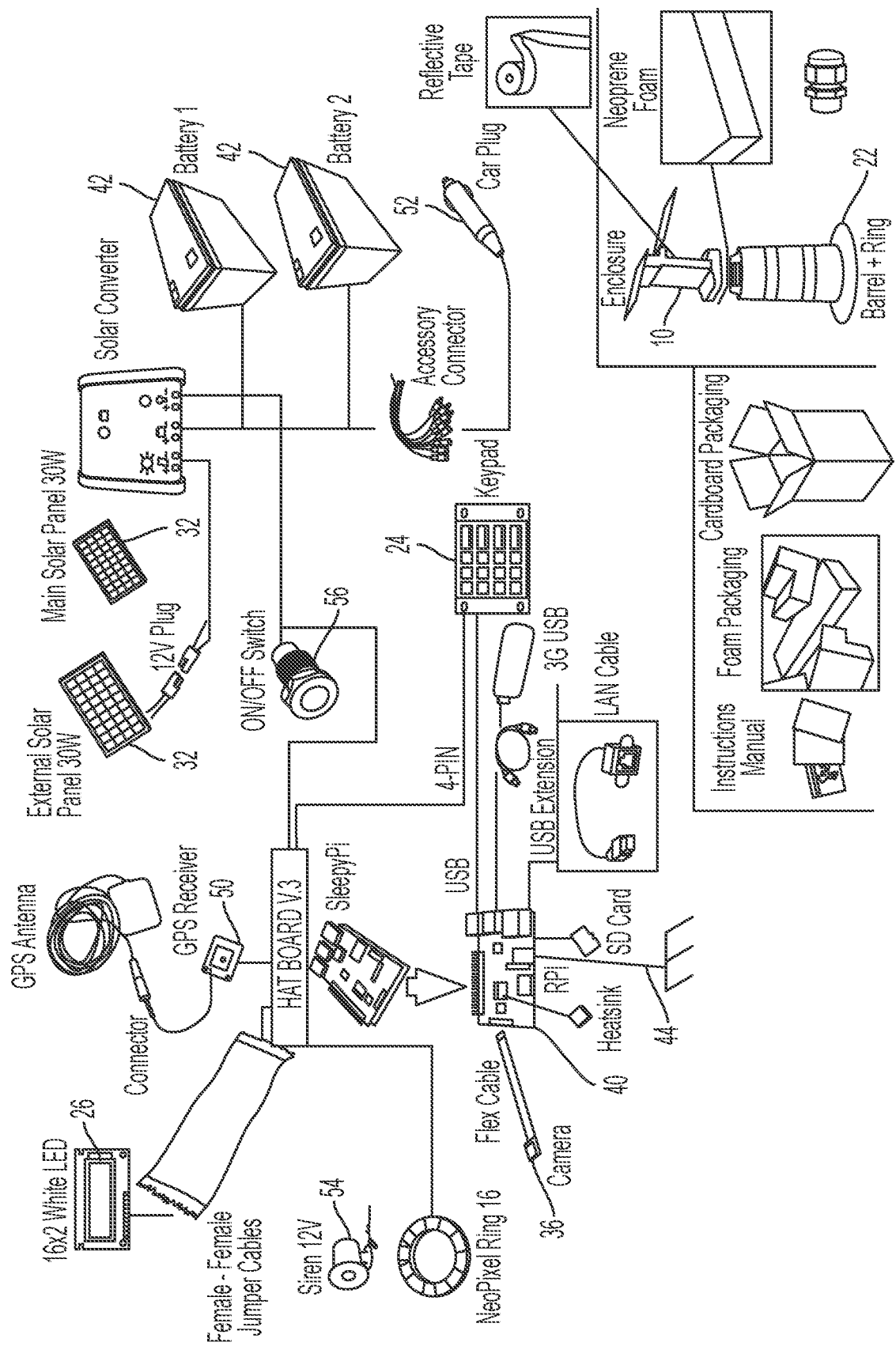
FIG. 23 illustrates the major electronic components of the data center.
Figure 24:
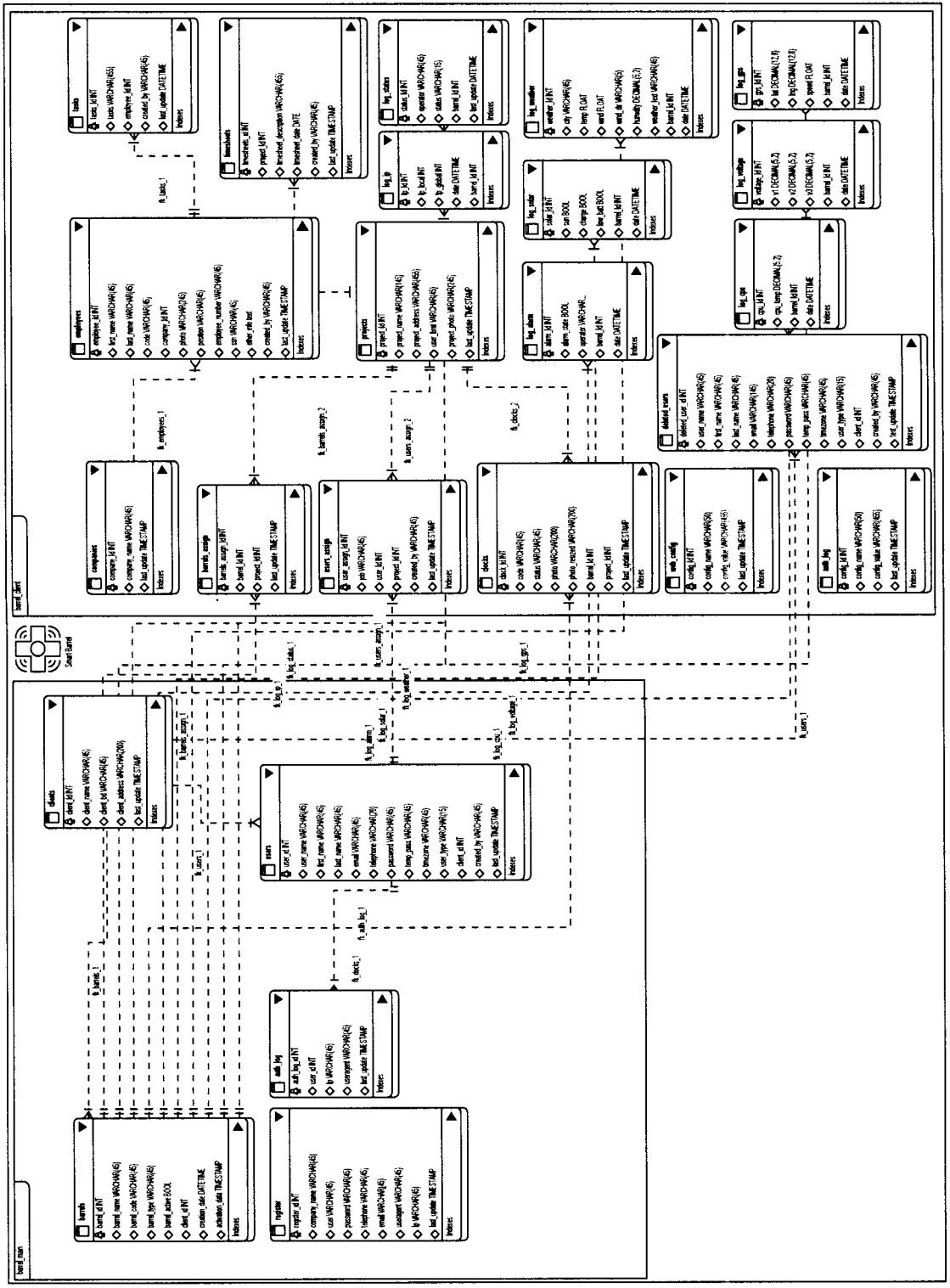
FIG. 24 is the software algorithm flowchart used in the preferred embodiment system of the data center.

FIG. 23 provides an overview of the main electrical components of the data center 10. The heart of the data center is an advanced PCB with a microprocessor that runs preferably a Linux-based operating system, namely, the CPU 40. The data center's main CPU runs a numerous amount of codes for security, GPS tracking, internet connection, device diagnosis, software and self-diagnostic check-up and much more. The CPU 40 connects all the electronics together, controls and monitors their functions, and acts as an electronic conduit between the on-site workers and off-site supervisory personnel. The software algorithm flowchart for the CPU is shown in FIG. 24.

Parts:

SD Card where the main operating system storage is available.

3G/GPRS/4G/5G/Satellite Modem is used to get the data center connected to the internet, the data center can operate with some minor down time, but independent internet connection is preferred. A data antenna 44 might be needed depending on the modem used, signal strength, surrounding interference, and its utility function.

Stainless-steel keypad connected via USB to the main computer board.

Camera uses a HEX cable or USB to connect directly to the computer board.

GPS is connected via GPIO pins directly onto the board. The GPS has also external weather proof adapter antenna to detect highest GPS signal possible.

LED Ring is connected to the CPU board for power and data commands.

LCD screen is wired to the CPU board via GPIO pins.

12V alarm siren horn plugged directly to MOFSET CPU board.

A female LAN cable and/or a female USB cable are also wired directly onto the CPU board.

The CPU is powered via USB cable that is plugged to a USB 12V to 5V converter.

12V output is provided from a solar converter that takes inputs from the solar panel and 12V batteries.

The data center is equipped with preferably one solar panel (rated 30 W at 12V) and another optional (30 W at 12V).

The data center stores its power in two 12V 7 ah batteries. Varying types of rechargeable lithium batteries are preferred, but others can be used as long as performance requirement is met.

The main power source is wired to the ON/OFF switch 56 that controls the power flow to the CPU board.

PCB for voltage readings and converter LED status readings.

Uninterruptible Power Supply (UPS) for AC power charging.

In alternative embodiments, the data center may be built to be lighter, stronger and cheaper for scale production. The housing may be rotor molded or injection molded allowing for mass production at a cheaper rate while maintaining consistent quality. The housing allows for a more rugged enclosure that is able to withstand further falls, hits, and other construction obstacles. The data center may also feature a customized power management board with a microcontroller that is in charge of the data center power management. The board is constantly monitoring the battery level and makes sure that the battery has always enough power for the next upcoming employee clocking cycle. The data center will use algorithm and advanced pattern detection Artificial Intelligence from the data center cloud to learn and expect when are the next clocking's going to happen, for how long and at what time. With the data in mind, the data center power controller can notify the management about any forecasted power loss to reduce fears for the data center crashing or seizing due to power loss.

In various alternative embodiments, the LCD display screen 26 can vary in terms of shape and size, but one preferred feature is its position, placed right below the camera lens 36. It forces the worker to face the camera while reading he screen instruction, which enables a better facial scan for the facial recognition detection to be used for security, login, etc.

An alternative embodiment features an additional product mount. The data center is developed to act as the mother "Internet of Things" (IoT) device onsite, i.e., the central hub in a network of devices. This will enable the primary data center to monitor and control other on-site secondary data centers, or other slave devices (e.g., remote cameras, motion detectors, weather station, etc.) that can communicate or interact with the primary data center.

Figure 28:
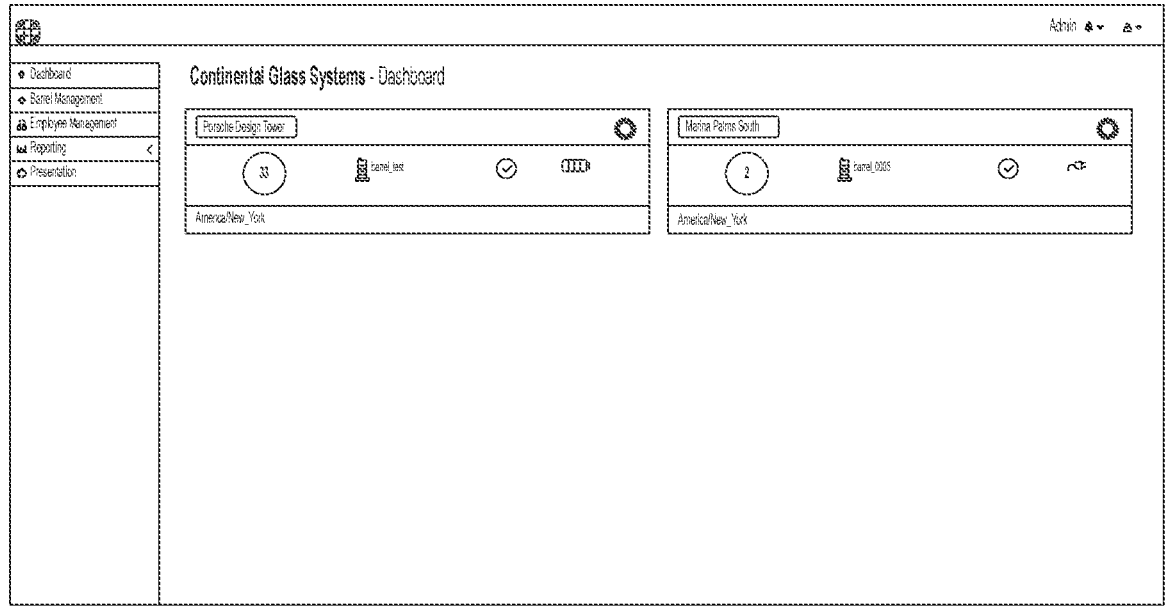
FIGS. 28-29 are screenshots illustrating a typical web page or dashboard page generated by the data center as viewed on a pc, tablet, or like internet enabled device.
Figure 29:
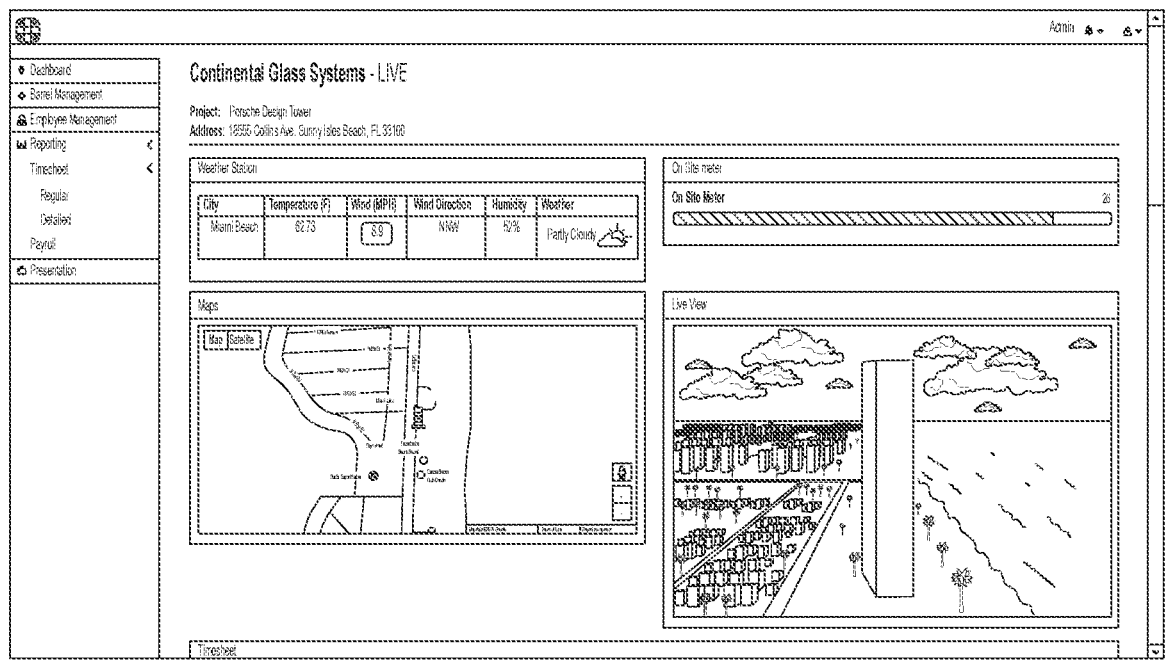
Figure 30:
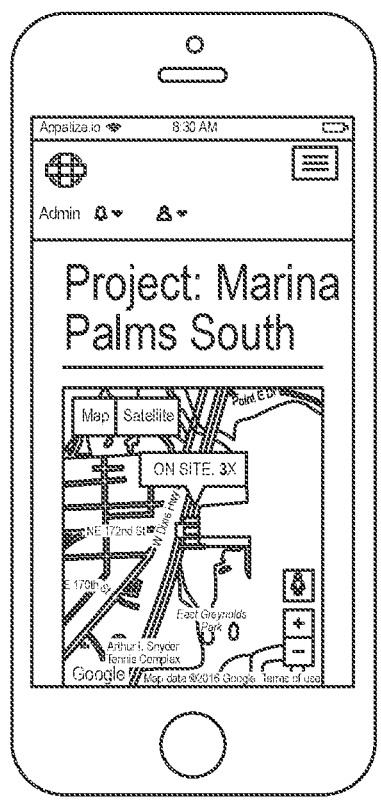
FIG. 30 is a screenshot of a web page generated by the data center as viewed on a smartphone or like mobile device.
Figure 31:
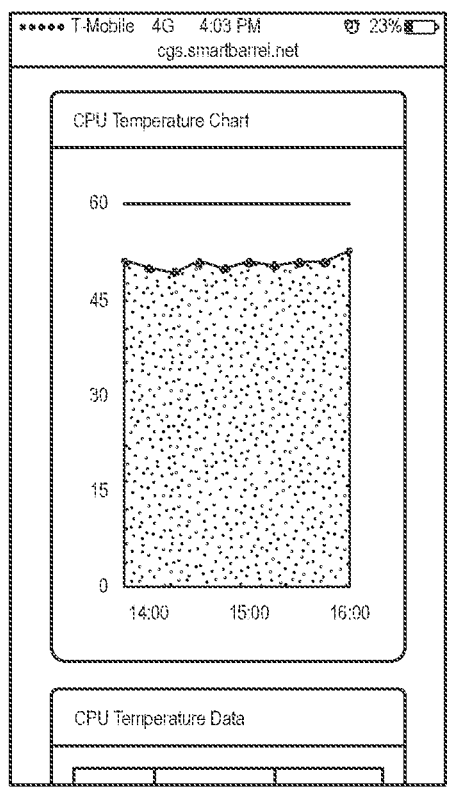
FIG. 31 is a screenshot as viewed on a mobile device showing the CPU operating temperature of a data center.
Figure 36:
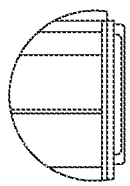
FIGS. 32-37 shows an alternative embodiment data center housing.
Figure 37:
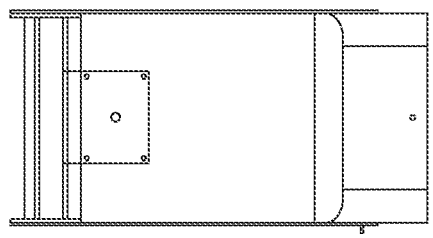
Figure 33:
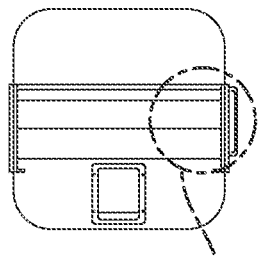
Figure 34:
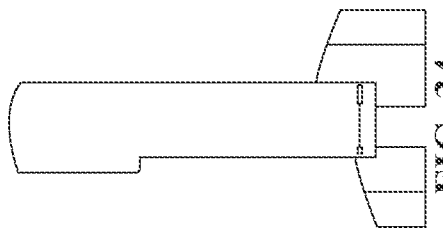
Figure 35:
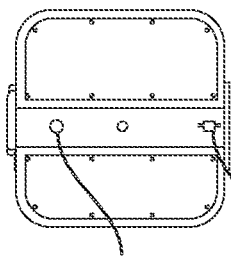
Figure 32:
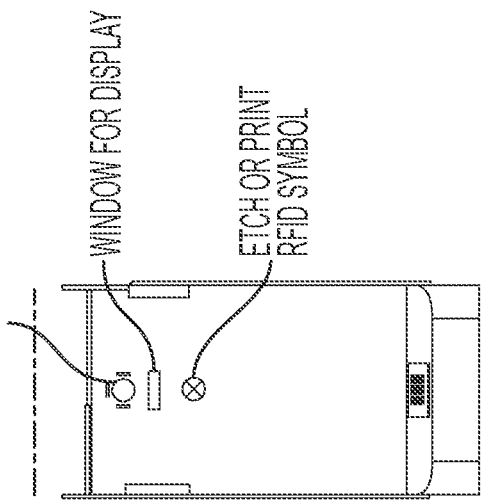

The data center camera 36 is preferably an IP camera that can be connected wirelessly or wired to the CPU inside the housing. The camera 36 can take both internet connection and data to transmit images or live video stream to a remote device, such as a pc, cell phone, and which appears on a dashboard on an internet page (FIGS. 28, 29).

The data center in an alternative embodiment may include an access control app or control software that enables a remote user to control a system lock (electromagnetic or solenoid lock for, e.g., the control panel (containing the keyboard 24 and display 26), the physical door 62, or other device. The access control software applies different logic subroutines to enable a door to be accessed by a worker, e.g., allowing the worker to clock in, enter code to access the data center, etc.

Figure 17:
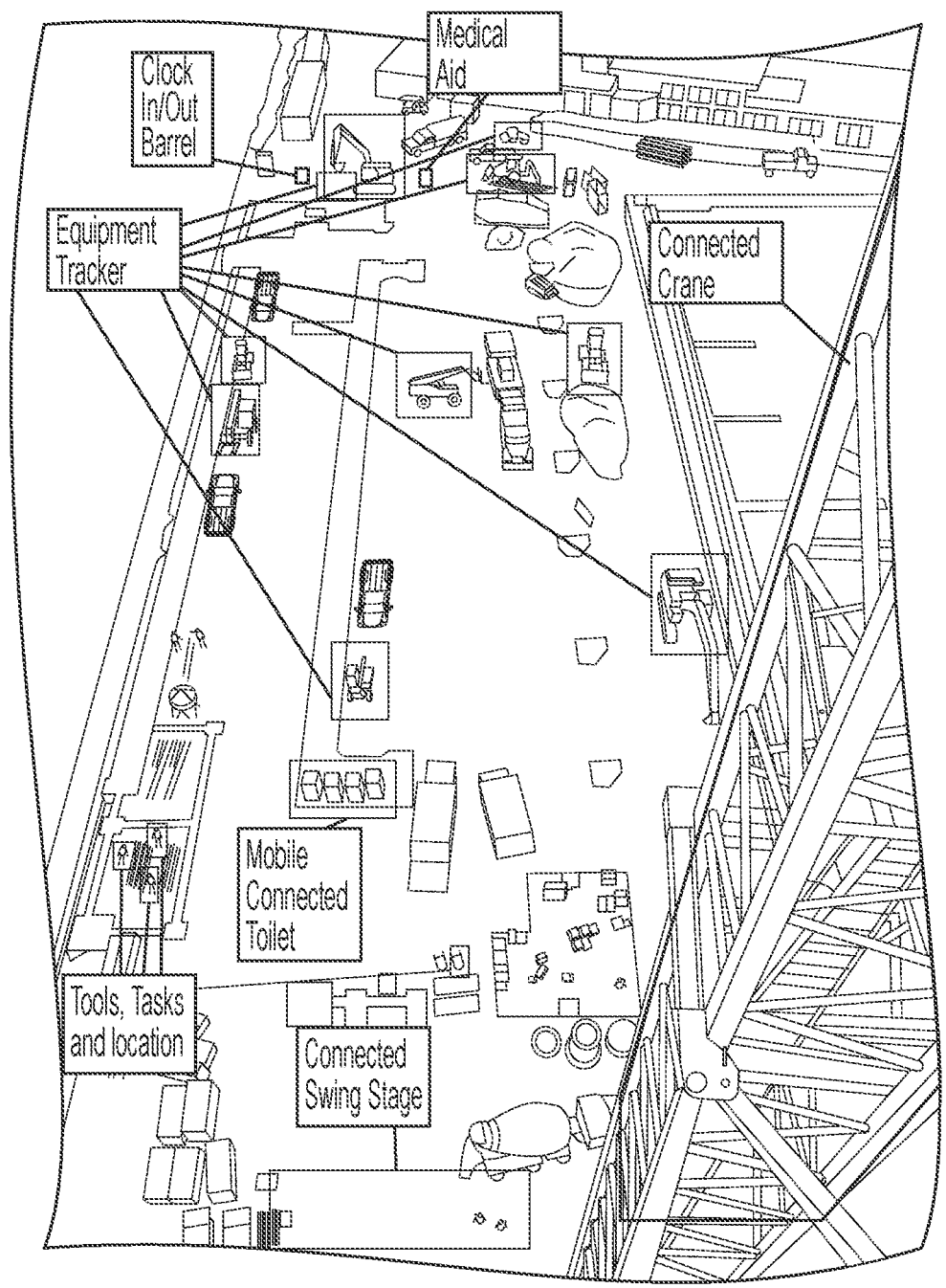
FIG. 17 is a plan view looking down on a typical construction site employing the present invention data center.

In an alternative embodiment, third party tracking devices are mounted on construction equipment (e.g., a dump truck, a crane, etc.) and communicate directly with data center. Different equipment would require different communication protocol for various application, for example, enable engine ON for the dump truck; enable a worker to use that equipment; enable a worker to move and transport a device. This is seen in FIG. 17.

In an alternative embodiment, the data center and connected hardware can work alongside other hardware and provide urgent on-site medical care. For example, the data center can call for an ambulance and send it automatically to the data center location via the GPS; and/or act as an intercom with a first aid specialist or medical expert. This embodiment requires a speaker and microphone to be integrated into the housing to interface with the worker or user.

In an alternative embodiment, the data center utilizes Radio Frequency (RF) electronics that function as a radio. The radio receives local radio station programs, music, messages that are broadcast via the speaker. The data center can use UHF or other radio frequencies and transmit data from online (internet) to local radio frequencies enabling workers or management to hear and participate in conversations happening onsite while being geographically anywhere.

In an alternative embodiment, the data center can track tools and accountability for tools. Indeed, a worker using or carry tools can be tracked via an App to RFID to camera scanning. The idea is to track tools alongside the workers to make sure there is clear identification and recognition of tool usage, and equipment flow.

In an alternative embodiment, the data center monitors wearable devices that can be in the form of a bracelet worn by a worker, or attached to helmet worn by the worker. The wearable devices might have RFID tags, accelerometer, GPS module, and allows the data center to track the worker activity onsite to see his or her level of activity. The wearable device may have wireless transmitters that ping data center or a smart phone connected to the data center. This is useful to alert a medic or to summon help in case of an emergency. The wearable device might also have other sensors to detect, e.g., the wearer's pulse, body temperature, etc. This wearable detection function serves as an additional health monitoring system for the benefit of the workers' health in extreme weather conditions.

Mounting and Application for the Data Center

1. Installing

Grab the data center by the handle, get to site where it needs to be installed, check if site is clear (no roof, sun access, etc.). Mount international base adapter and make sure the data center is at required height from the ground, or simply place on the traffic or safety barrel in the designated place.

Boot the data center ON from the concealed ON/OFF switch.

Place the data center on the international base or traffic barricade and lock the device in place using the locking mechanism.

The LCD display shows "Booting . . . " Once connection is established and data center is up and running, the LCD display flashes green.

2. User Clocking

The worker or user walks to the data center, enters his or her credentials (i.e., most preferably his cellphone number) on the keypad and hits enter. Depending on the data center's pre-setup by management, the user might be prompted to choose from a menu that varies in the application, such as Press 1 for IN, 2 for Out, 3 for Lunch Start, and 4 for Lunch End. Once the user chooses the option needed, the camera snaps a picture with or without a flash once the user's face is in frame. The camera waits until it detects a face before snapping the picture. The LED ring projects a level light line to help the user line up his face and whether he needs to raise or lower his head to get into the frame. The user then receives a text message on his phone, if enabled by management, confirming his clock time. The data center is then ready for the next user. Different setting can be applied to provide various clocking speed from instant to very detailed and multi-prompt. Additional layers can be added to the clock in system based on customer needs. A user might be prompted to enter a cost code after his choice of clocking type if the construction company requires so.

In an alternative embodiment, the camera takes more than a simple picture. The data center camera system is able to snap a series of pictures from the moment the user reaches the data center to the moment the clock in is completed. The images will be later on uploaded to the cloud where they will be analyzed for face detection and face recognition. They uploaded facial data will also be stitched into a gif or other short video formats to be later displayed on the internet web page or dashboard. This will allow a more interactive and "alive" dashboard where the management will tend to develop a more realistic bond with their construction workforce. The camera is positioned on the data center at a specific height from the ground with a wide-angle or fish eye angle lens that will allow a wider view, which can cover multiple heights of workers. The camera module may have an infrared (IR) night vision module, which is ideal for image taking in late night or pre-dawn working hours. The IR module can detect the user even when images are taken in dark hours. The IR enabled camera may also have a flash, flash light, or LED light to illuminate the face of the worker in dark hours. The LED flash or light might be enabled based on battery and power level, and also takes into consideration time of day and might be reading data from the camera itself or light sensitive sensor mounted somewhere on the housing.

3. Technical Support or Data

Codes can be entered on the data center to retrieve:

Device Status: battery life, CPU temperature, internet connection status, battery level, etc.

Environment Status: weather, forecast, ambient temperature, wind speed, snowfall, rainfall, etc.

Statistics: Total number of clockings today, number of users, number of errors, wrong codes, etc.

911 emergency phone dialer and call (if enabled).

4. Anti-Theft Security System

If the data center is moved without proper authorization, the GPS and/or motion sensors inside the housing detect that it is moving. This triggers a loud beeping alarm that will attract the attention of surrounding people, local police, or an on-site security patrol. The data center halts all operation until an authorized code is entered. When the alarm is triggered, the data center can notify management or a supervisor via SMS, email, automated call, or any other needed service. Further, the GPS module provides to management and authorized site supervisors of the whereabouts of the stolen data center. The data center preferably contains no data stored locally; rather all digital data are stored in the cloud at a remote server.

Housing or Enclosure Designs

Figure 15:
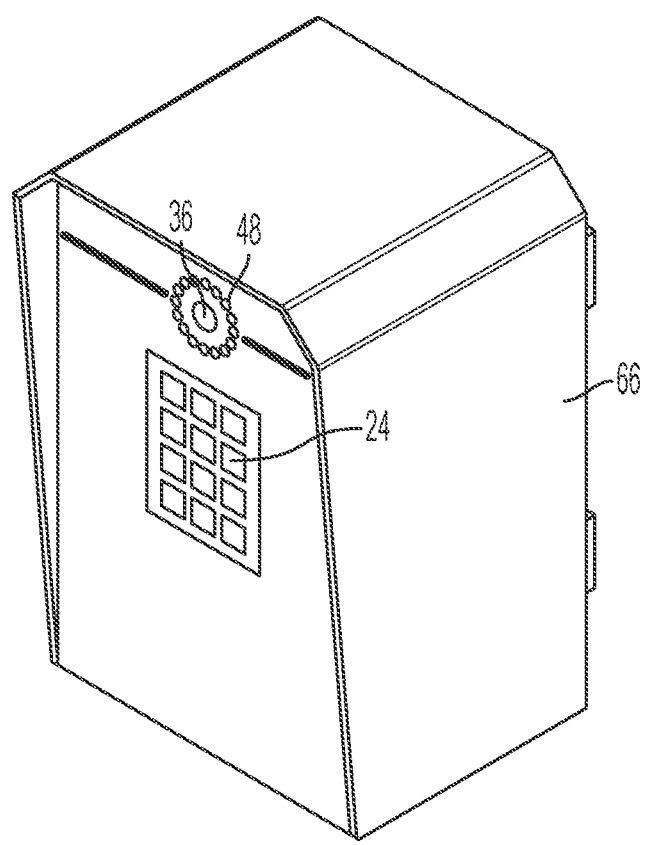
FIG. 15 is a perspective view of an alternative embodiment data center having a wall mount housing.

FIG. 15 shows an alternative embodiment housing 66. The above-described hardware can be contained in various shapes of housings. The keypad 24, camera 36, and LED ring 48 are located on one vertical face of the housing 66. This housing 66 is designed for wall mount, such as attachment to a construction site barrier, a fence, or a wall.

Figure 19:
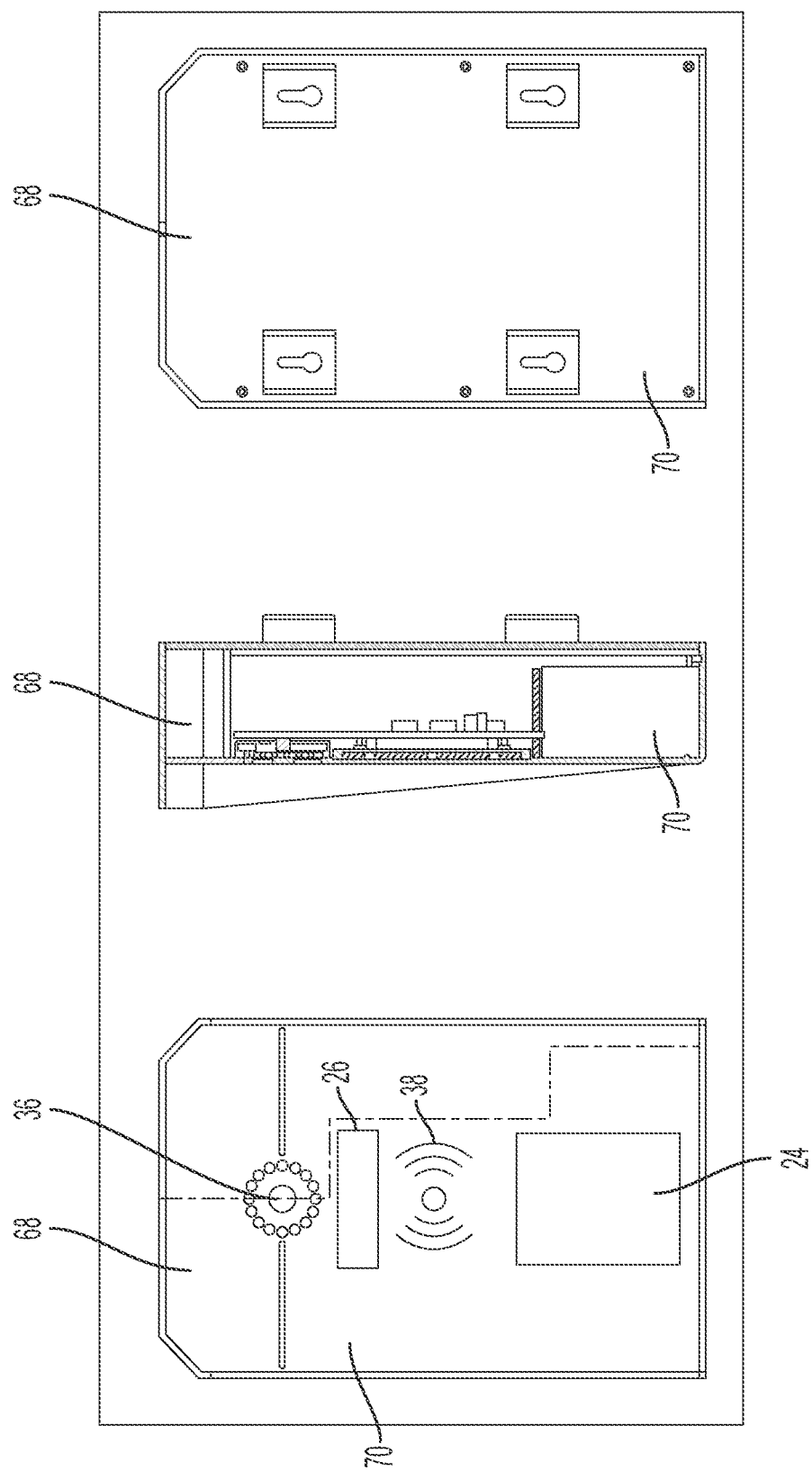
FIG. 19 contains multiple views of another alternative embodiment data center having a wall mount configuration.

FIG. 19, in front, side, and back views, shows an alternative embodiment data center 70 having a flat plank shape for the housing 68, similar to a tablet. Such a tablet-shape housing 68 is preferably mounted to a wall r construction site barrier. The tablet data center 70 features wireless connectivity via 3G/4G/5G/LTE and/or Wi-Fi, and is powered preferably by a house AC line source. The tablet data center 70 includes a similar UX/UI as the housing for a construction barrel, which would require the worker/user to enter his phone number on a keypad 24, choose the type of clock function he wants to register and then have a series of pictures taken of his face by the camera 36. The electronic data is processed exactly as described in prior disclosed embodiments. The tablet data center 70 is preferably used for the office workers in offices or trailers to make sure the entire workforce is covered.

FIGS. 20-22 show an alternative embodiment housing 58 that has a barrel shape. FIGS. 32-35 shows the present invention data center with another alternative embodiment housing configuration. FIGS. 38 and 39 are front and a cross-sectional side views of an alternative embodiment wall mount housing 72 having a camera 36, LED lighting 26, and a keypad 24 disposed on the same surface. Rear mount extensions 74 seen in FIG. 39 may include magnets for attachment to a metal wall, or the extensions can be screwed into a wood fence or drywall.

Software and Application

The data center is part of a system. Once the workers or users enter their clock function, the internet connected data center instantly sends the data to a cloud-based server where the data is securely stored and backed up. No data is stored on the data center unless the connection is troubled, when during reconnection to the internet, the electronic data are temporarily stored locally on a SD driver or like memory inside the data center.

Once the data is sent to the server, a web-based platform is used to display the electronic data, and may include other data. FIG. 24 graphically depicts the online platform, providing direct control of the data center; e.g., an authorized user may add or eliminate users, allow access control, check data center status, assign specific data centers to projects or jobs, add or eliminate admin access, check live employee clockings, check updated current and forecasted weather (via APIs based on GPS, or via accessory weather station for more accurate readings), integration of major project via live camera streaming, to have all of the major site information available within a remote or local manager's reach, updating live such data on a web page or dashboard page. This is seen in FIGS. 28-31. The software allows management to communicate with the workforce via SMS, or assigning tasks for coming days, track their hours over days, weeks, or years.

The software has multiple smart programs and APIs (FIG. 24) that run algorithms to track user behavior, user of the month, user total hours, and much more. The software can also track the data center behavior, predict housing misplacement problems by recognizing if the housing battery is not charging probably comparing it the current weather conditions, etc.

Multiple data centers can be assigned to the same construction site and they all work together to achieve a unified outcome. Each user can clock in from one data center and clock out from another and the system logs and stores all the information/electronic data accordingly. The system may integrate with most third-party companies to easily implement their services and software onto the dashboard and unify the view and monitor of the site.

The software runs all sort of reports to enable greater value to the device owner:

Time Sheet—Tracking all clock in and clock out for a specific day, or range of days.

Payroll—Issue payroll for any range of dates. Download the report into most payroll processing firms such as QuickBooks, Paychex, Sage, Intuit, etc.

Project Report: Generate overall project report, total number of employees involved, total number of hour involved, dollar value if available, time sheet description on timeline, etc.

User Report: Generate report per user for a date range, see some insights about worker behavior, worker average clock ins, average clock out, total hours, total overtime, assigned tasks, and the like.

The system contemplates an automated live presentation mode, which is a precast video that can be projected on a monitor inside an office or work environment to provide live updates for the overall company/project/job performance to monitor on a project or big screen TV.

The system contemplates a custom designed bot that can take direct instructions from the admin user to fetch results faster and in a more interactive way.

For example:

User: What time did John get in today?

Bot: John Smith or John Williams?

User: Smith

Bot: Alright! John Smith Clocked In at 7:08 AM, he also clocked out at 10:22 AM working a total of 3 hours 14 minutes.

The user interaction with the product and software is revolutionary. The web page or dashboard (FIGS. 28, 29) provides a wide range of explorable data via a computer and mouse, or even via VR headset to see work site condition via the data center camera. Indeed, the on-board camera of the data center may also be mounted on a motorized mount to rotate its field of view. Alternatively, the 360-camera view compatible accessory can be mounted on the data center housing and can be accessed by the project manager remotely via VR (Virtual Reality) headset, allowing the project manager to virtually browse the construction site.

The back-end software application is non-limited to the basic front-end user-device interaction. Many chronology task (i.e., timed automated script) and other advanced server and front-end based algorithm are automatically run to track and analyze various amount of data such as:

User Pattern.

Weather/Solar Ration.

Weather forecast/weather warnings and notifications.

Weather to task forecast and anticipation.

Face recognition control.

Employee behavioral pattern, movement, health telemetry, and advanced notifications.

Data center health status, behavior, location, usage.

Employee of the month advanced algorithm computations.

The system software has also smart bots that interact with social media websites to look up its users (if approved by user) and post their latest updated posts, such as "Steve John checked in at his project at 7:05 AM" or "Steve is feeling excited to be at work!".

Also, smart programs can detect user content and, when permitted, share to all other users creating a more friendly and familiar community. Automatic social sharing can enhance the relationship between its users creating further and more bonding, loyalty and trust to the construction project.

The system also provides a unified web page or dashboard to unify various data centers and their derivatives that all interact together to build a smart-connected work environment. The website acts as a platform, open for further development and integration of multiple data centers. Different data centers can all interact together to provide the ultimate amount of data and control on any job site.

For instance, in the construction industry, it is possible to create such a system by connecting several components into one web dashboard. The system associated with the present invention data center is applied to a construction site such as shown in FIG. 17. The alternative embodiment system contemplates:

Artificial Intelligence (AI) and Machine Learning Software

Data center cloud is the major support system for the data center device, with multiple components of the cloud working together.

Face Detection & Recognition and Stitching Software

The data center cloud stores the facial recognition (and/or construction site) images, will try to locate a face and later on try and assess who does the face belong to. Having the phone number entered, the images will be tested to see if the image(s) received matches the phone number entered by comparing it to previous clockings and another user's clockings. The script will also stitch the images into an animation for display at later stages at the dashboard, as displayed on a mobile device, a website, a tablet, etc. The data center image detection might be an in-house written code, a third-party API or a marriage of both. The performance of image detection and recognition will vary from image to image and from condition to condition.

Jobsite Pattern Recognition

With time, the data center cloud will learn about the jobsite, number of workers, operating hours, what time the jobsite starts, what time it closes and will be able to learn when the data center is needed, any detected "irregular" worker behavior such as late clock out, too early of a clock in. This data can be used for analytical reasons, for battery power management, but also for detection of unwanted or unauthorized worker behavior.

Battery Power Management Software

Every data center reports to the cloud its, e.g., CPU temperature, voltage readings and power consumption. Those readings are then put in a neural network where further computation and analysis takes place to understand the jobsite behavior, battery consumption, weather and other environmental elements to make sure the battery is running at its most optimum consumption and to make sure it never runs out power. The data center recognizes the jobsite patterns of clock ins and clock outs from another AI, and can also learn the weather from the weather AI, be able to predict when the sun is up and down, battery charging time and charging speed. The data center system takes all of the data and makes sure it is using the least power to charge the battery the fastest. The system and data center are on and ready when workers need it the most to optimize the experience and its lifetime.

Worker Pattern Recognition Software

Worker behavioral pattern recognition is an AI software that is constantly working on learning the behavior and pattern of each worker in the system. The system is constantly analyzing the worker clock in times, clock out times, breaks, consistency in the hours, total amount of hours, days of week, physical location, health, etc., and is trying to learn the behavior of the worker compared to other workers in the data center cloud, in the jobsite, or in his company. Worker pattern detects a new worker, makes sure he is being prompted to clock-out every time he clocks in, help the worker build a historical record of clocking in and out. This ensures the record is accurate and minimized fraud or mistakes.

Worker Digital Profile Software

The labor force has always been the last to integrate with technology. The highest resistance to technology has always been with outdoor and field professions. The data center AI automatically generates a digital profile for each worker while gathering all his or her information such as contact info, cell number, facial profile, work history and so on. The worker may then choose if he wants his profile public or private and this allows his data to be seen by others in the market place to possibly hire him. This feature can be referred to as "LinkedIn Like" profile.

Data Center API

Third Party Software Integration

Payroll Software—The data center web dashboard integrates its data with payroll services to automate the payroll process. Using third party software integrated with the data center system, the data center sends worker attendance or activity time charges to payroll to generate paychecks. Example of such third-party companies are QuickBooks Payroll, ADP, Paychex, etc.

Construction Software

Many construction software operate as SaaS and provide a wide range of services for the construction industry, such as RFI submittals, shop drawing submittals, comments, annotations, paper tracing and so on. The major issue is that they always miss the field aspect. Therefore, the present invention data center system API can integrate with third party software and share the data for a full stack service.

Construction Solutions

Other companies might have IP cameras onsite, RFID or tags on their tools. Therefore, the present invention data center uses APIs that can integrate with existing solutions to provide a full stack solution.

Other Usage

The present invention data center may have software APIs that can also be used as an SDK to allow developers to build application on top of the hardware. This allows the data center hardware to do more custom designed work in various applications and industries.

Clock In/Out Software

Typical application of the present invention data center API is for an employee or worker time clock. This API generates reports displaying all the employees entering and exiting the job site along with site weather conditions. Also, on entry, the data center can allocate a task for each employee that is pre-set by the management.

Equipment Tracker

The present invention data center can monitor and track heavy construction equipment, may function as an electronic key switch to activate the equipment. The code used to activate the equipment can be unified with the Step 1 "Clock In/Out." An equipment tracker can be attached to the equipment to track important KPI's such as gas in the fuel tank, time operating, any on board errors, GPS track and other technical data. The equipment tracker may be equipped with a camera view (fish eye, panorama stitch view, 360-degree, or simple lens camera) to record the action while the equipment is up and running. The equipment now has a log of who was operating it, when and for how long. And in case of any accident, a recorded view can pin point the accident down for liability purposes.

The equipment tracker can have multiple power source, such as solar power with backup battery charging from the equipment engine (such as dynamo and so on). The equipment tracker can be installed and mounted on any existing equipment with minimal investment and work. Alternatively, the equipment tracker is self-clamped on all existing hardware. The equipment tracker can also be electronically linked to the data center security system for theft protection.

Mobile Connected Toilet

Portable construction toilets can have a mounted device that tracks toilet location and a basic sensor counts the number of times door is opened, used, measuring toxins, smell, toilet water level and other information that can contribute in safety and statistics of toilet life utility. The toilet monitor wirelessly communicates with the data center, which collects such electronic data for the cloud and admin review.

Tools, Tasks and Location

Management now can track the use of their equipment on the dashboard website. Management can see which employee or worker is using which tool and where he or she is using it. The data center tracks and monitors the location of expensive tools. Management can monitor the utilization of such tools via the website dashboard. Tools can be tracked by barcode, RFID, GPS and other sensors. Managing the tools can be achieved by the native application supplied with the tools or the data center software. Employee responding to task progress can also update the system of the employee task progress and task location.

Connected Swing Stage

Swing stages, scaffold or suspended scaffold can be equipped with a smart device that allows a user via the present invention data center to turn it ON/OFF, track its altitude, measure the wind speed, check for safety diagnostics, track employees on swing, equipped with a camera that can record the action once the swing stage is in action. All data is transmitted live to the cloud via the data center where it can also be monitored on the website dashboard.

Connected Crane

Cranes are active cabins that are the skeleton of the project. They are the highest point. As seen in FIG. 17 from the point of view of a crane, they oversee and supply the material from ground floor to anywhere on site and mostly the roof of a building. A crane can be equipped with a smart device or camera and microphone that can place more eyes and ears to the crane operator by making sure the cargo dropped is safe and no employee are underneath or in the way. Also the smart device can track weight, wind speeds, close-up view of the end of the crane cable. The smart device can beep if it sees anyone in range notifying danger to ground employees. The crane smart device can also beep loudly once in movement to provide extra safety measure by providing awareness to employees on ground that overhead there is a movement. The cane smart device would channel all such electronic information to the data center, which then can broadcast audible signals to the ground crew and to management monitoring remotely via the internet. Indeed, all the data in terms of movement, elevation, pictures, videos, buzzes and communications can be transmitted live to the dashboard via the data center, allowing a major overview of the crane operation and functionality.

Software Structure that incorporate all of the above features

Database & Architecture Design

Database funnels all traffic through one main database

Database is created for projects (global Unique Key per projects)

All products, devices, companies, users report to one specific international project ID Companies have also unique global ID that can projects throughout all the devices, users, etc.

The main purpose and intent of the software is to create a major social platform that allow all construction project to be part of that greater network where equipment, labor, machines and tasks are transferred and interact.

In the construction industry it can be greatly beneficial in the sense of overall project performance monitoring, progress, task tracking, cost forecasting and so on. The project can finally be virtually projected and monitor via live data in equipment, GPS locations, tasks updates and images as conducted via the present invention data center.

With the advancement of IoT it is no longer feasible to control and single source the data. The data center cloud enables an advanced architectural process that enables the query of all events (in the range of hundred thousand) and queues them and processes them based on importance on different servers. The servers are capable of scaling and descaling based on the query loads, which makes the system very efficient and to a very high extent failure proof. The cloud server has multiple functionalities that vary from storing and preserving data, image stitching, image detection AI, image recognition AI, worker pattern and behavior learning, notification and alerts as well. All electronic and digital data are stored on the data center and in a cloud, and are encrypted and password protected to ensure the security of the data and workers' identity.

Data Center Web Dashboard

FIGS. 28-31 show a data center web page dashboard. It is a web application and/or mobile application that the workers and management can use to interact with mobile devices and the data center. The dashboard shows status of the data center in terms of battery power, CPU temp and other "device health" metrics. The dashboard can receive data entry and store such data, like worker information. Further, rules and conditions of workers entry might vary from usage from one site to another, so the dashboard is highly customizable. The dashboard features include different views, map, live stream, third party apps, monitors, sending invite to other users, issues permission levels, payroll, admin, user ID and permission, etc. Users can configure via the dashboard any notifications, alerts and so on depending on the user and position of the user in the company.

Smart Barrel can be installed in any public or private location, and with the appropriate signage and firmware, the device can act as a recruiting device by collecting data whether from collecting phone numbers only or by collecting further info using a full keypad. The Device can also communicate with user via SMS to collect further information once communication was initiated.

Typical Field Application: Agriculture Industry

Similar to the construction industry, the agriculture industry faces the same number of challenges in terms of labor tracking and labor management. Hourly workers are called in to work outdoors on various agricultural tasks. The hour tracking, labor tracking, task assignment and all other features utilized in the construction industry can also be applied in the agriculture farming industry.

Typical Field Application: Mining Industry

The mining industry is one of the most dangerous workplaces. The work conditions are very harsh. They are located farther away from any civilized structures, houses, offices, and power sources, and telecommunication and data lines, etc. The present invention data center IoT connected device can solve not only the labor tracking issue, but can also act as a geological forecaster by forecasting earthquakes, notifying the superintendent and management of any weather changes, earth forecasts, etc. Further sensors can connect instantly with the present invention data center time clock and report the data live to the cloud where the data is processed, analyzed and pushed down to the web dashboard in forms of reports, alerts, notifications, etc.

Typical Field Application: Military

The military in the U.S. or abroad is constantly involved in construction and related projects where they require the use of hourly workers in a specific location or area. The present invention data center can provide an on-spot secure time attendance machine that can report the data to a local agency. It also offers transparency for government agencies internationally based to get a closer monitor on hours spent and make sure work is on budget. The data center with its communication portal can provide way more than just time attendance and labor tracking—it can also issue customized reports depending on conditions to designated receivers.

Typical Field Application: Outdoor Event/Concert/Amusement Park

Installed on any outdoor event, the present invention data center can be equipped with a 360-video camera, Infrared cameras, or RFID readers, a mini printer or other compatible device to provide a wide range of services that varies from clocking employees, security, event visitors, ticket entry control, event admins, management, etc. The data center can assume a virtual role acting as a digital fence that triggers an alarm once the fence is crossed using the motion sensor.

Typical Field Application: City/Public Places

A city or municipality can use the present invention data center to track an employee whereabouts using a tab feature. The tab feature marks a point every time the employee clocks in. The employee is registered along with his or her picture, GPS location, and time stamp. This is useful for jobs that require long routes that may not have accessible power, such as parks, beaches, forest, suburbs, and so on. The data center also provides a cellphone charging station for users, tourists or just employee.

Typical Field Application: Outdoor Security System

The present invention data center can work solo, part of other data centers or integrated with an existing system. The data center can easily run advanced security scripts such as motion detecting, human/face tracking, car movement tracking, unwanted access, and other security measures.

The data center can buzz by itself loudly notifying the user or intruder that he has breached a secure area, flash red as a warning, notify by calling, text messaging, emailing, auto-calling or any other method per the device management or security officer. The data center can also communicate to the current security system and trigger pre-installed alarm system. The data center while mounted atop a traffic barrel can also run traffic monitoring to register car license plates, human driver faces, count human and pedestrian traffic, etc.

Typical Field Application: Outdoor Activities/Trails

The data center is built to withstand all outdoor harsh conditions. At a part or in the forest area, the present invention data center operates as a guide, provides first aid information, contacts security or medical help in a remote, unpopulated outdoor area far from any grid offerings.

Users can perform tasks such as locking their location, requesting help, getting feedback on their location or simply snap a memorable picture and get it on their email or devices.

While particular forms of the invention have been illustrated and described, it will be apparent that various modifications can be made without departing from the spirit and scope of the invention. It is contemplated that components from one embodiment may be combined with components from another embodiment.

What is claimed is:

1. A portable construction site data center that mounts to a construction site fixture, the data center comprising:
a portable housing having an exterior that is resistant to outdoor elements, the portable housing having a top and a bottom, wherein the housing includes a mounting platform for supporting the housing on the construction site fixture;
the housing having dimensions and a weight including contents enabling portability for hand carry;
a means for human interface and conversion to digital data, the means including a keyboard, a display, and a camera, disposed about the housing exterior;
a CPU with electronic memory contained within the housing, wired to the means for human interface and processing the digital data;
a GPS tracking module wired to the CPU;
a battery contained within the housing and powering the CPU, the means for human interface, and the GPS module;
a solar cell disposed at the top of the housing and wired to the battery, wherein the solar cell is disposed on a panel that is pivoted to the housing top, and the panel has a cantilevered section overhanging the housing exterior; and
at least one antenna wired to the CPU, wherein the antenna includes access to at least one of Wi-Fi, Bluetooth, and cellular network signals.

2. A portable construction site data center of claim 1, wherein the housing platform includes an elongated notch, and the construction site fixture includes a safety barrel with a top having an elongated, raised rib, and the housing rests on the barrel with the notch receiving the rib.

3. A portable construction site data center of claim 1, wherein the construction site fixture includes a wall and the housing is mounted to the wall.

4. A portable construction site data center of claim 1, wherein the housing includes a barrel shape and the solar cell is embedded into at least a portion of the top of the housing.

5. A portable construction site data center of claim 1, wherein the means for human interface further includes an RFID transponder.

6. A portable construction site data center of claim 1, wherein the digital data is transmitted via the internet to a remote, web-enabled device.

7. A portable construction site data center of claim 1, wherein the housing includes an inverted T shape with a central tower and the housing platform having first and second opposed platforms forming a notch therebetween, and wherein the first platform includes the keypad and the display, and the tower includes the camera, and the top of the tower includes a panel embedded with the solar cell overhanging the first platform.

8. A portable construction site data center of claim 1, wherein the electronic memory includes at least one of an SD card, flash drive, optical drive, thumb drive, USB drive, and a cloud server.

9. A portable construction site data center that is mountable on a construction site safety barrel, the data center comprising:
a portable housing having an exterior that is resistant to outdoor elements, the portable housing having a tower shape, with a top and a bottom, wherein the housing bottom includes a mounting platform supporting the housing on the construction site safety barrel;
the housing having dimensions and a weight including contents enabling portability for hand carry;
a means for human interface and conversion to digital data, the means including a keyboard, a display, a camera, and multi-color LED lighting, disposed about the housing exterior and mechanically sealed to resist environmental element entry into the housing;
a CPU with electronic memory contained within the housing, wired to the means for human interface and processing the digital data;
a GPS tracking module wired to the CPU;
a battery powering the CPU, means for human interface, and GPS module contained within the mounting platform of the housing;
a solar cell embedded in a movable panel that is disposed at the top of the housing and wired to the battery, wherein the movable panel includes a deployed position and a stored position; and
at least one antenna wired to the CPU, having access to at least one of Wi-Fi, Bluetooth, and cellular network signals.

10. The portable construction site data center of claim 9, wherein the solar cell panel is pivoted to the housing top, and the panel has a cantilevered section overhanging the housing exterior in the deployed position.

11. The portable construction site data center of claim 9, wherein the camera produces an image transmitted to the CPU that includes facial recognition software.

12. The portable construction site data center of claim 9, wherein the means for human interface further includes an RFID transponder.

13. The portable construction site data center of claim 9, wherein the housing platform includes a bottom with an elongated notch, and the construction site safety barrel includes a top with an elongated, raised rib, and wherein the housing engages the barrel with the elongated notch receiving the elongated raised rib therein.

14. The portable construction site data center of claim 9, wherein the construction site includes a plurality of data centers.

15. The portable construction site data center of claim 9, wherein the housing includes an alternate power supply providing electrical power to at least one of the battery, the CPU, the means for human interface, and the GPS module.

16. A portable, outdoor data center that mounts to an outdoor fixture for user interface and off-site access, the data center comprising:
a portable housing having an exterior that is resistant to outdoor elements, the portable housing having a top and a bottom, wherein the housing at the bottom includes a mounting platform for supporting the housing on the outdoor fixture;
the housing having dimensions and a weight including contents enabling portability for hand carry;
a means for user interface and conversion to digital data, the means including a keyboard, a display, a camera, and LED lighting, disposed about the housing exterior;
a CPU with electronic memory contained within the housing, controlling the means for user interface and processing the digital data;
at least one antenna wired to the CPU, wherein the antenna includes access to at least one of Wi-Fi, Bluetooth, and cellular network signals in communication with the internet;

wherein the user via a mobile device accesses the digital data via the antenna and the internet;

a GPS tracking module wired to the CPU;

a power supply including at least one of a battery and an alternate electrical input disposed within the housing and powering the CPU, the means for user interface, and the GPS module; and a movable solar panel wired to the power supply and disposed at the top of the housing, and when moved a deployed position, the solar panel at least partially overlies the display and keyboard.

17. The portable construction site data center of claim 16, wherein the alternate electrical input includes a car plug charger.

18. The portable construction site data center of claim 17, wherein the housing includes an inverted T shape with a tower extending above the platform at the bottom.

19. The portable construction site data center of claim 17, wherein the camera provides facial recognition electronic data.

\* \* \* \* \*